(12) United States Patent  
Tsubaki

(10) Patent No.: US 9,413,962 B2  
(45) Date of Patent: Aug. 9, 2016

(54) IMAGE CAPTURE APPARATUS AND CONTROL METHOD THEREFOR

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/494,391

(22) Filed: Sep. 23, 2014

(65) Prior Publication Data

US 2015/0085149 A1 Mar. 26, 2015

(30) Foreign Application Priority Data

Sep. 26, 2013 (JP) ................................. 2013-200520

(51) Int. Cl.
*H04N 5/228* (2006.01)
*H04N 5/232* (2006.01)
*H04N 5/262* (2006.01)

(52) U.S. Cl.
CPC ....... *H04N 5/23254* (2013.01); *H04N 5/23258* (2013.01); *H04N 5/23267* (2013.01); *H04N 5/23277* (2013.01); *H04N 5/23287* (2013.01); *H04N 5/2628* (2013.01)

(58) Field of Classification Search
CPC ............ H04N 5/23248; H04N 5/2329; H04N 5/23254; H04N 5/23251; H04N 5/144; H04N 5/145; H04N 5/23258; H04N 5/23261; H04N 5/23264; H04N 5/23267; H04N 5/2328; H04N 5/23287; H04N 5/23277; G06T 7/20; G06T 7/0024; G06T 7/0038; G08B 13/19602; G09G 2320/106; G03B 2217/005; G03B 2205/0007; G03B 2207/005; G03B 2205/0015; G03B 2205/003; G02B 27/646

USPC ............................... 348/208.1–208.99, 222.1
See application file for complete search history.

(56) References Cited

U.S. PATENT DOCUMENTS

| 7,978,221 | B2 * | 7/2011 | Hiraga | H04N 5/23232 348/208.12 |
| 8,169,490 | B2 * | 5/2012 | Kondo | H04N 5/23248 348/208.1 |
| 8,446,526 | B2 * | 5/2013 | Furukawa | G09G 3/2025 348/452 |
| 2006/0165397 | A1 * | 7/2006 | Uehara | G03B 17/02 396/55 |

(Continued)

FOREIGN PATENT DOCUMENTS

| JP | 2008-259076 A | 10/2008 |
| JP | 2009-105784 A | 5/2009 |

(Continued)

*Primary Examiner* — Chia-Wei A Chen
(74) *Attorney, Agent, or Firm* — Cowan, Liebowitz & Latman, P.C.

(57) ABSTRACT

An amount of change between images is calculated based on a motion vector between images obtained by an image sensor and on shake information related to a shake in a rotational direction around at least an axis perpendicular to an optical axis of an imaging optical system. Then, based on a shake correction amount determined based on the shake information and the amount of change, an image obtained by the image sensor is geometrically deformed. The amount of change is a shake component of the image capture apparatus in a direction perpendicular to the optical axis, and is calculated after cancelling at least one of a change between images caused by the shake in the rotational direction included in the shake information and a change between images caused by an influence of a difference between exposure periods of the image sensor.

13 Claims, 11 Drawing Sheets

(56) References Cited

U.S. PATENT DOCUMENTS

| | | | |
|---|---|---|---|
| 2006/0177209 A1* | 8/2006 | Miyasako | G03B 19/12 396/55 |
| 2007/0196087 A1* | 8/2007 | Kosaka | G03B 17/17 396/55 |
| 2008/0055571 A1* | 3/2008 | Makii | G02B 27/646 353/101 |
| 2008/0129830 A1* | 6/2008 | Inoue | G03B 5/00 348/208.2 |
| 2008/0266673 A1* | 10/2008 | Hoshi | G02B 15/173 359/687 |
| 2008/0298789 A1* | 12/2008 | Ohki | H04N 5/23245 396/52 |
| 2009/0009657 A1* | 1/2009 | Kawai | H04N 5/23248 348/373 |
| 2009/0047009 A1* | 2/2009 | Nagano | G03B 5/00 396/55 |
| 2009/0086333 A1* | 4/2009 | Take | G02B 15/173 359/676 |
| 2009/0102931 A1* | 4/2009 | Yoshikawa | G11B 27/329 348/207.2 |
| 2009/0268042 A1* | 10/2009 | Kawai | G03B 5/00 348/208.7 |
| 2009/0284609 A1* | 11/2009 | Matsunaga | H04N 5/23248 348/208.12 |
| 2010/0165480 A1* | 7/2010 | Yamaguchi | G02B 27/646 359/686 |
| 2010/0201828 A1* | 8/2010 | Mitsuya | H04N 5/3572 348/208.6 |
| 2011/0013029 A1* | 1/2011 | Akutsu | G03B 5/00 348/208.11 |
| 2011/0032615 A1* | 2/2011 | Usui | G02B 27/646 359/554 |
| 2011/0149096 A1* | 6/2011 | Matsuyama | H04N 5/23248 348/208.6 |
| 2012/0044369 A1* | 2/2012 | Irisawa | H04N 5/23248 348/208.4 |
| 2012/0132709 A1* | 5/2012 | Lowrey, III | F41C 27/22 235/407 |
| 2012/0249814 A1* | 10/2012 | Miyoshi | H04N 5/2328 348/208.7 |
| 2013/0039640 A1* | 2/2013 | Sekimoto | G03B 17/00 396/55 |
| 2013/0063615 A1* | 3/2013 | Takeuchi | H04N 5/23258 348/208.5 |

FOREIGN PATENT DOCUMENTS

| | | |
|---|---|---|
| JP | 2010-025961 A | 2/2010 |
| JP | 2011-145604 A | 7/2011 |

* cited by examiner

RS DISTORTION (YAW)　　　RS DISTORTION CORRECTION (YAW)

○ ✖ △ : INTEREST POINT

RS DISTORTION (PITCH)　　　RS DISTORTION CORRECTION (PITCH)

○ ✖ △ : INTEREST POINT

RS DISTORTION (ROLL)　　　RS DISTORTION CORRECTION (ROLL)

○ ✖ △ : INTEREST POINT

FIG. 6A
FIG. 6B
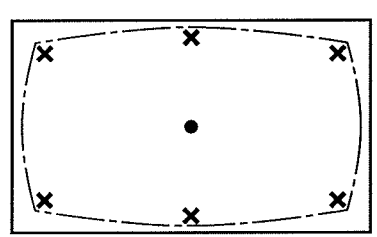
ORIGINAL IMAGE
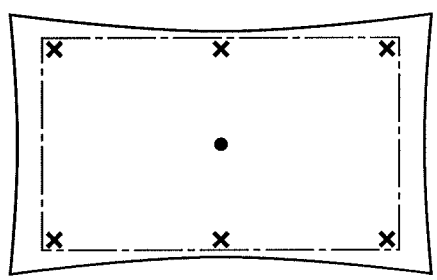
IMAGE FOR WHICH SKEW
CORRECTION HAS BEEN PERFORMED
× : INTEREST POINT
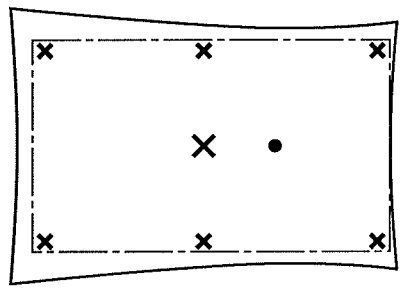
IMAGE FOR WHICH SKEW
CORRECTION HAS BEEN PERFORMED
AFTER MOVING REFERENCE COORDINATES
FIG. 6C FIG. 7A
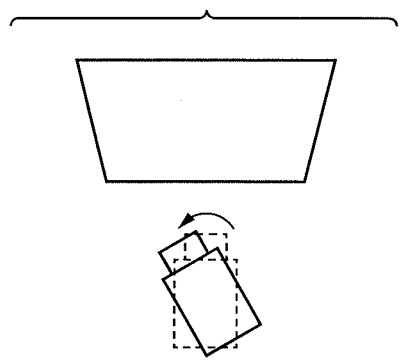
FIG. 7B
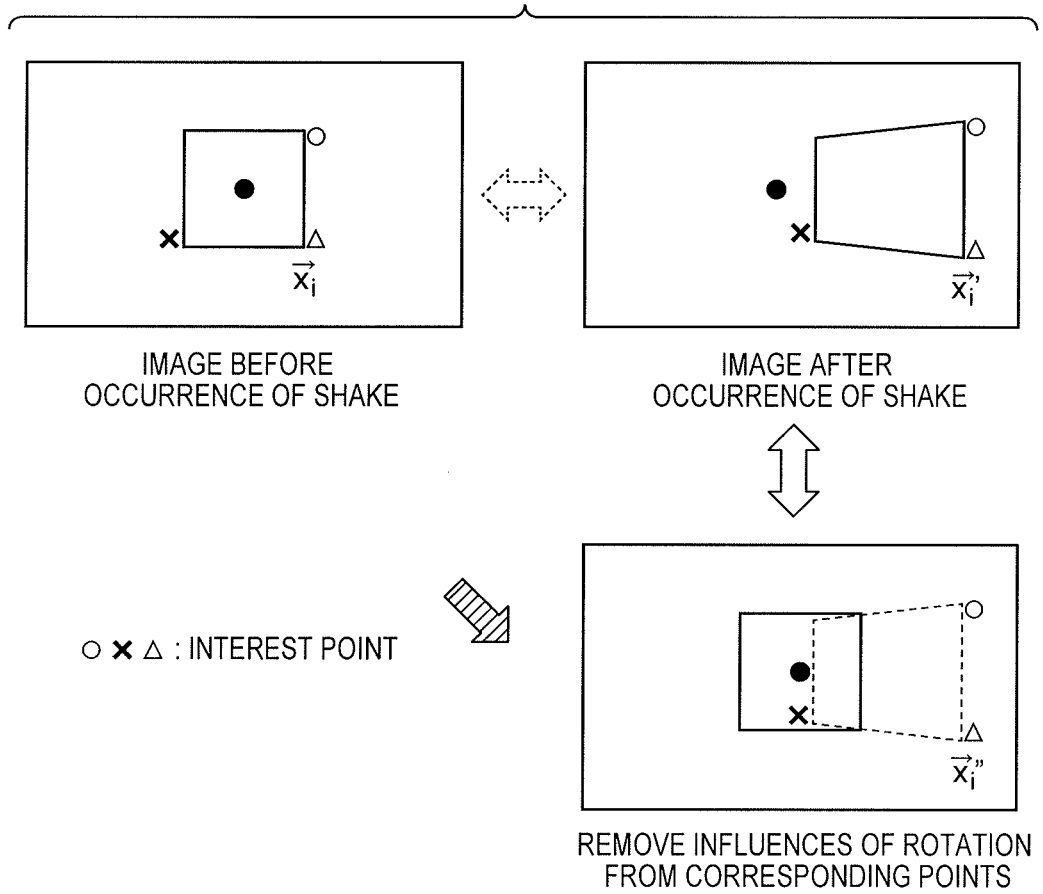
○ ✕ △ : INTEREST POINT
FIG. 7C

TRANSLATION

MAGNIFICATION/REDUCTION

PLANAR ROTATION

PROJECTION (YAW DIRECTION)

PROJECTION (PITCH DIRECTION)

IMAGE CAPTURE APPARATUS AND CONTROL METHOD THEREFOR

BACKGROUND OF THE INVENTION

1. Field of the Invention

The present invention relates to an image capture apparatus and a control method therefor, and in particular to an image capture apparatus with an anti-shake function and a control method therefor.

2. Description of the Related Art

Conventionally, a so-called image stabilization function is known that corrects (alleviates) a shake of a captured image (an image shake) caused by a movement of an image capture apparatus, and representative methods for realizing the image stabilization function include optical image stabilization and electronic image stabilization (Japanese Patent Laid-Open No. 2011-145604). The optical image stabilization is a method for reducing a movement of an image of a subject by moving optical elements such as a shift lens and an image sensor along a plane perpendicular to an optical axis based on a detected amount of shake of an image capture apparatus. On the other hand, the electronic image stabilization is a method for reducing a movement of an image of a subject by setting an effective pixel region smaller than a capturable range and shifting the position of the effective pixel region based on a detected amount of shake of an image capture apparatus. They are both techniques to reduce a shake of a captured image (an image shake) caused by a movement of an image of a subject in vertical and horizontal directions (translation of an image).

Such an optical anti-shake function is based on a movement of an image capture apparatus obtained using sensors that detect a rotational motion around a yaw axis (horizontal axis) (in a left-right direction), as well as a rotational motion around a pitch axis (vertical axis) (in an up-down direction). These sensors, however, cannot detect a translational motion in three directions (a motion parallel to coordinate axes) and a rotational motion around a roll axis (optical axis) among six-degree-of-freedom motions of the image capture apparatus. While the translational motion can be detected by providing an acceleration sensor as described in Japanese Patent Laid-Open No. 2010-25961, this is not easy for implementation and cost reasons. The same goes for a sensor that detects a rotational motion around the roll axis.

Meanwhile, Japanese Patent Laid-Open No. 2008-259076 proposes a technique to correct an image shake caused by a six-degree-of-freedom movement of an image capture apparatus (a rotational motion in three directions and a translational motion in three directions) by applying geometric deformation processing to a captured image in accordance with a motion vector detected from the captured image. An image correction technique using the geometric deformation processing can be utilized not only for correction of an image shake caused by a movement of the image capture apparatus, but also for correction of optical aberration, correction of a rolling shutter distortion unique to a CMOS image sensor, correction of a distortion that occurs in a case where an image of a subject is captured from below (projection distortion), etc. In view of this, it is thought that more advanced anti-shake effects can be achieved by applying the geometric deformation processing to an image for which optical hand movement correction has been performed (optical anti-shake image).

However, a method for detecting and estimating an image distortion using a motion vector at the time of application of the geometric deformation processing lowers the accuracy depending on scenes, increases an amount of computation necessary for high-accuracy estimation, and makes the estimation itself difficult. For example, in the case of a low-contrast image, such as an image captured indoors, it is more likely that a motion vector fail to be detected and an erroneous motion vector is detected. Therefore, for example, if a rolling shutter distortion is corrected in accordance with a moving subject, there is a possibility of the occurrence of harmful effects, e.g., a distortion of a portion that is supposed to be still, and a continuous image shake after the correction.

Furthermore, if a rolling shutter distortion in a roll direction is estimated from a motion vector simultaneously with the shake of the image capture apparatus, there will be more estimation variables, leading to an explosive increase in an amount of computation and destabilization of solution estimation. Furthermore, it is basically not easy to estimate a rolling shutter distortion from a motion vector with high accuracy. Moreover, the difficulty will further increase if correction parameters for a radial distortion and optical aberration such as transverse chromatic aberration are simultaneously estimated from a motion vector.

SUMMARY OF THE INVENTION

The present invention has been made in view of the above problems of conventional techniques. The present invention provides an image capture apparatus and a control method therefor, the image capture apparatus being capable of accurately correcting, for example, an image shake caused by a movement of an image capture apparatus that is not detected by a sensor by applying geometric deformation processing with use of information obtained from the sensor.

According to one aspect of the present invention, there is provided an image capture apparatus comprising: a detection unit configured to detect a motion vector between images obtained by an image sensor; an obtaining unit configured to obtain shake information related to a shake in a rotational direction around an axis perpendicular to an optical axis of an imaging optical system; a calculation unit configured to calculate an amount of change between the images based on the shake information and on the motion vector; a determination unit configured to determine a shake correction amount based on the shake information and on the amount of change; and a deformation unit configured to geometrically deform an image obtained by the image sensor based on the shake correction amount, wherein the calculation unit calculates a shake component of the image capture apparatus in a direction perpendicular to the optical axis as the amount of change, after cancelling at least one of a change between images caused by the shake in the rotational direction included in the shake information and a change between images caused by an influence of a difference between exposure periods of the image sensor.

According to another aspect of the present invention, there is provided a control method for an image capture apparatus, comprising: a detection step of detecting a motion vector between images obtained by an image sensor; an obtainment step of obtaining shake information related to a shake in a rotational direction around an axis perpendicular to an optical axis of an imaging optical system; a calculation step of calculating an amount of change between the images based on the shake information and on the motion vector; a determination step of determining a shake correction amount based on the shake information and on the amount of change; and a deformation step of geometrically deforming an image obtained by the image sensor based on the shake correction amount, wherein in the calculation step, a shake component of the image capture apparatus in a direction perpendicular to the optical axis is calculated as the amount of change, after cancelling at least one of a change between images caused by the shake in the rotational direction included in the shake information and a change between images caused by an influence of a difference between exposure periods of the image sensor.

Further features of the present invention will become apparent from the following description of exemplary embodiments with reference to the attached drawings.

BRIEF DESCRIPTION OF THE DRAWINGS

FIGS. 6A to 6C are diagrams for describing examples of skew correction in an embodiment.

FIGS. 7A to 7C are diagrams for schematically describing rotational movement removal processing in an embodiment.

DESCRIPTION OF THE EMBODIMENTS

Exemplary embodiments of the present invention will now be described in detail in accordance with the accompanying drawings.

First Embodiment

Figure 1:
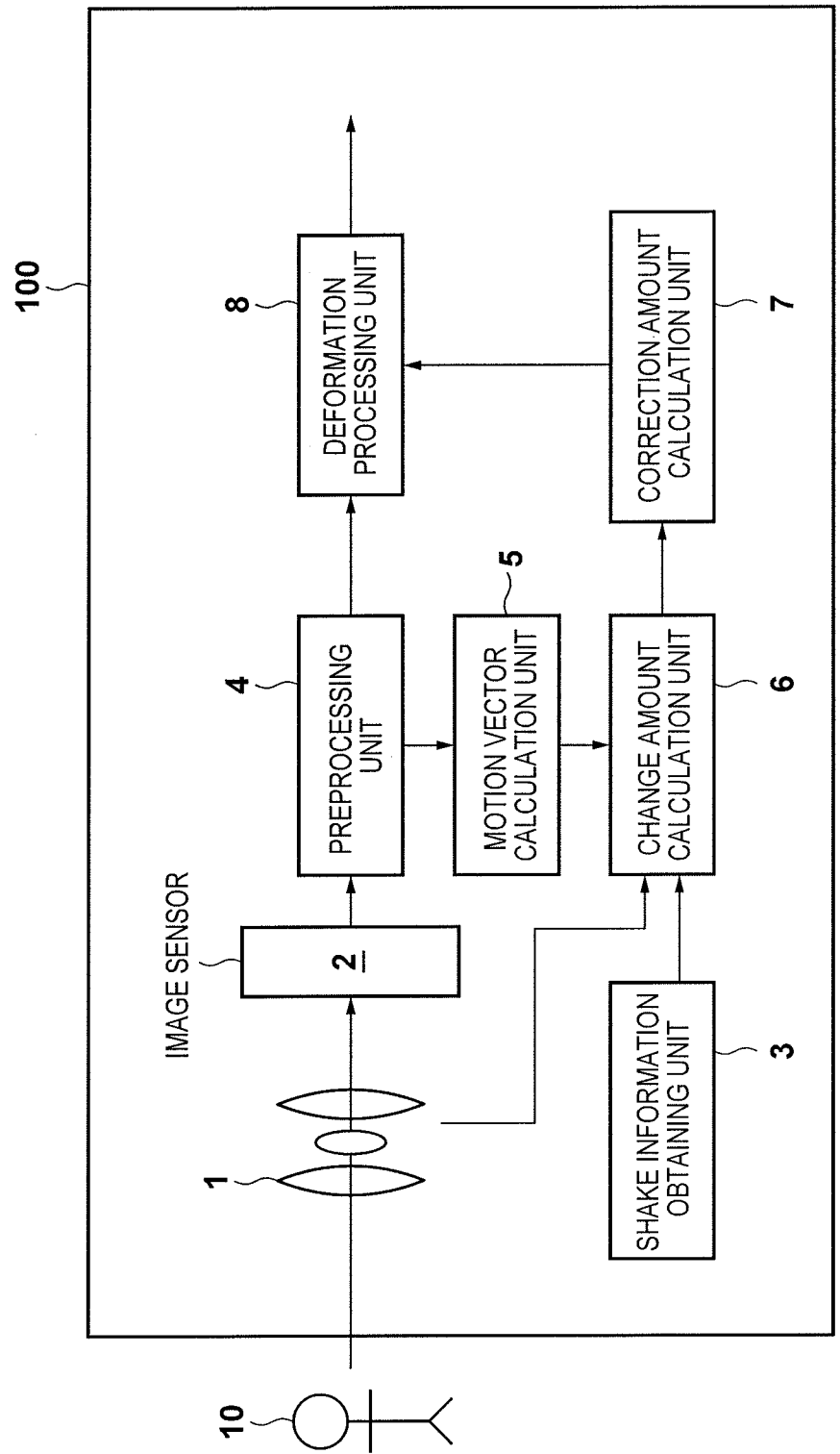
FIG. 1 shows an example of a functional configuration of a digital camera, which is one example of an image capture apparatus according to a first embodiment, related to anti-shake control.

An exemplary embodiment of the present invention will now be described in detail with reference to the attached drawings. FIG. 1 shows an example of a functional configuration of a digital camera 100, which is one example of an image capture apparatus according to a first embodiment of the present invention, related to anti-shake control. In FIG. 1, a part of a configuration of a general digital camera that is not directly related to the present invention is omitted.

An optical system 1 is an imaging optical system that includes a plurality of lenses, such as a focus lens, and a mirror, and focuses incident light from a subject 10 onto an imaging plane of an image sensor 2. The image sensor 2, which is a CCD image sensor or a CMOS image sensor, is composed of a plurality of pixels that are two-dimensionally arrayed. It is assumed that the image sensor 2 according to the present embodiment is a CMOS image sensor as the present embodiment describes an example in which a rolling shutter distortion is corrected through geometric deformation processing; alternatively, it may be a CCD image sensor.

A shake information obtaining unit 3 includes, for example, an orientation sensor such as a gyroscope, and is attached to any axis perpendicular to an optical axis of the optical system 1. The shake information obtaining unit 3 outputs a signal indicating an orientational change of the digital camera 100 to an optical anti-shake control unit 3 and a calculation unit 8. For example, if the orientation sensor is a rotation sensor, the shake information obtaining unit 3 is attached to axes of yaw and pitch directions of the digital camera 100 and measures an orientational change caused by rotation around the axes.

A preprocessing unit 4 applies, to an analog image signal obtained through photoelectric conversion of the image sensor 2, fundamental processing such as noise removal by correlated double sampling (CDS), exposure control by way of gain-up through automatic gain control (AGC), black level correction, and A/D conversion. The preprocessing unit 4 supplies an obtained digital image signal to a deformation processing unit 8. The preprocessing unit 4 is also referred to as an AFE (analog front-end). If the image sensor 2 outputs a digital image signal, the preprocessing unit is referred to as a DFE (digital front-end).

A motion vector calculation unit 5 receives, as input, continuous image frames (frame images) output from the preprocessing unit 4, such as luminance frames, luminance and color difference frames, or RGB frames. It should be noted that the motion vector calculation unit 5 may receive, as input, frame images output from the preprocessing unit 4 after they have been processed by an image processing unit included in the digital camera 100 for detecting a motion vector. Image frames for detecting a motion vector may be, for example, differential image frames, binary image frames, and the like. The motion vector calculation unit 5 detects a motion vector (motion information) between input frame images.

The motion vector calculation unit 5 calculates a motion vector between a current frame image input by the preprocessing unit 4, that is to say, a current frame, and an old frame image that was input and accumulated in a working memory of the preprocessing unit 4 or the motion vector calculation unit 5 therebefore. An old frame image may be a frame image that was captured immediately before a current frame, and may be a frame image that was captured therebefore. By constituting the working memory by, for example, a so-called first-in-first-out memory, an amount of delay in output can be controlled by the number of memory blocks.

A change amount calculation unit 6 calculates amounts of image change between frame images based on the following.
  Camera parameters including a focal length (an angle of view) of the optical system 1, a pixel size of the image sensor 2, and the like
  Information of an orientational change of the digital camera 100 obtained from the shake information obtaining unit 3

Motion vector information obtained from the motion vector calculation unit 5

A correction amount calculation unit 7 calculates an amount of geometric deformation for shake correction, that is to say, a correction amount by processing the amounts of image change output by the change amount calculation unit 6 in chronological order. At this time, the correction amount calculation unit 7 calculates the correction amount in consideration of the intensity of correction, a margin amount of geometric deformation, and the like.

The deformation processing unit 8 applies calculation for realizing geometric transformation to image data output by the preprocessing unit 4 based on the correction amount calculated by the correction amount calculation unit 7, on the camera parameters such as the focal length and the pixel size, and the like.

Once the influences of a shake have been reduced in frame images through the geometric deformation processing by the deformation processing unit 8, the frame images are displayed on a display unit included in the digital camera 100, and are recorded by a recording unit into a recording medium such as a semiconductor memory card and a magnetic recording device after being coded as necessary. The frame images may also be transferred to an external apparatus via wired or wireless communication. These are examples of the use of a captured image; a captured image may be used in superimposing an HDR image or in any other way.

The operations of the elements will now be described in order.

First, the shake information obtaining unit 3 transforms sensor output information in the form of a voltage value, current value, or digital value obtained from, for example, the gyroscope constituting the orientation sensor at a frequency corresponding to a sampling frequency $f_{s\_g}$ into an amount of angular change, and outputs the amount of angular change. For example, assume that the shake information obtaining unit 3 is an orientation sensor utilizing a gyroscope that performs digital output. In this case, the shake information obtaining unit 3 obtains an angular velocity $rat_{x\_g}(i)$ by multiplying a sensor output value $val_{x\_g}$ of each coordinate axis direction by a correction gain $gain_x$ that has been obtained by preliminary calibration, as indicated by Expression 1. It should be noted that it is not necessary to use one sensor for one axis, and it is permissible to use a sensor that can measure orientational changes around multiple axes at once.

$$rat_{x\_g}(i) = gain_x \cdot val_{x\_g}(i)(x=Y,P(,R)) \quad \text{(Expression 1)}$$

Here, "x" denotes an axis direction of a Cartesian coordinate system in reference to the optical axis of the optical system, and is one of the yaw direction (x=Y), the pitch direction (x=P), and the roll direction (x=R) of the digital camera 100. In the present case, the shake information obtaining unit 3 detects angular velocity information for the yaw and pitch directions, and does not detect angular velocity information for the roll direction; therefore, the roll direction (x=R) is placed in the parentheses. Also, "_g" denotes information obtained from measurement values of the orientation sensor (shake information obtaining unit 3).

Furthermore, angular velocity information calculated by the shake information obtaining unit 3 can be considered as an orientational change of the digital camera 100 expressed by an angular change in one sampling period of the gyroscope, $t_{s\_g}=1/f_{s\_g}$. A plurality of sample values may be integrated to reduce a data amount and then supplied to the correction amount calculation unit 7 if an information amount per unit time is too large due to a high sampling frequency, or depending on the use. For example, angular velocity information may be integrated to be appropriate for a sampling frequency $f_{s\_rsc}$ if it is used in calculation of an amount of rolling shutter distortion correction, and for a sampling frequency $f_{s\_fr}$ if it denotes an orientational change between frames.

For example, while $f_{s\_g}$ exceeds 1 kHz in some cases, $f_{s\_fr}$ may be 60 Hz and 30 Hz, in which case approximately 20 to 30 samples are integrated. Furthermore, ideally, $f_{s\_rsc}$ should be a value for a timing corresponding to image heights of pixels. However, as this frequency exceeds 60 kHz at the time of capturing moving images of an HD resolution at a frame rate of 60 fps, angular velocity information is obtained at a highest possible sampling rate exceeding at least a frame rate. For an image height that does not correspond to a timing for obtaining angular velocity information, a value is generated from a sample value obtained at another timing by making use of, for example, prediction, interpolation, and hold techniques.

Information generation processing at a high sampling rate may be executed by a functional block that utilizes angular velocity information, such as the correction amount calculation unit 7 and the deformation processing unit 8. Below, an arbitrary sampling frequency is noted as $f_{s\_y}$ (:$f_{s\_rsc}$, $f_{s\_fr}$, ...). Information is exchanged after transformation into an appropriate amount of orientational change of a sampling period on a processing-by-processing basis through integration based on the following Expression 2.

$$rat_{x\_y}(j) = \int_0^{n_{y\_g}-1} gain_x \cdot val(n_{y\_g}j+t)dt \quad \text{(Expression 2)}$$
$$= \sum_{i=0}^{n_{y\_g}-1} (gain_x \cdot val(n_{y\_g}j+i) \cdot t_{s\_y})$$

where $dt=t_{s\_y}$. Note that $n_{y\_g}$ is a scale factor ($f_{g\_y}/f_{s\_y}$) of a sampling period ($1/f_{s\_y}$) after integration under the assumption that a sampling period ($1/f_{s\_g}$) of the orientation sensor is one. Also, $rat_{x\_y}(j)$ denotes an amount of orientational change corresponding to a sampling target y and period j with respect to the aforementioned axes x (the yaw and pitch axes (and the roll axis)). Also, $t_{s\_y}$ denotes a target-by-target sampling interval (=$1/f_{s\_y}$).

The shake information obtaining unit 3 may be configured to perform output after applying processing for improving the accuracy to sample values of the sensor. For example, if the gyroscope is used, processing for reducing the offset drift can be applied. As one example of such a configuration, the drift may be reduced by, for example, adding an acceleration sensor and executing processing for comparing orientational change information. Processing for improving the accuracy of sensor output values is not limited to particular processing, and any known technique can be used.

The motion vector calculation unit 5 calculates a motion vector (motion information) between a current frame that was processed by the preprocessing unit 4 most recently and an old frame that was processed and stored into the working memory in the past. In calculation of a motion vector, a motion vector between frames or loci between characteristic points calculated in each frame are calculated using template matching, table matching between the characteristic points, motion vector estimation based on a gradient method, and the like.

Figure 2:
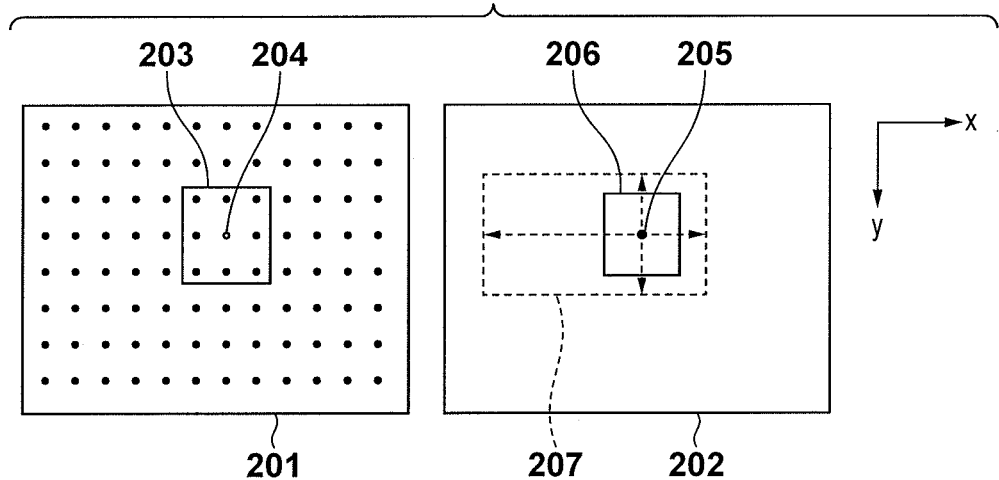
FIG. 2 is a schematic diagram for describing block matching.

FIG. 2 shows an example of block matching, which is one type of template matching. It is assumed here that an old frame is a reference image 201, and a current frame is a search image 202. The motion vector calculation unit 5 considers a partial region of a predetermined size, which includes an interest point 204 at its center among points arranged in the reference image 201 in a grid-like pattern, as a template 203, sets an arbitrary search region 207 in the search image 202, and searches for a region that matches the template 203 the most. Specifically, the motion vector calculation unit 5 computes degrees of similarity with the template 203 in the reference image 201 while changing the position of a region 206 in reference to an interest pixel 205 in the search image 202, and searches for a region with the highest degree of similarity. An SSD (Sum of Square Difference), an SAD (Sum of Absolute Difference), an NCC (Normalized Cross-Correlation), and the like can be used as indexes for degrees of similarity. It should be noted that the normalized cross-correlation is often used in a case where luminance fluctuations between frames could possibly be intense as in live-action images; therefore, it is assumed that the normalized cross-correlation is used in the present embodiment as well. Provided that the size of the template 203 is N×M (pixels), a calculation expression for scores of degrees of similarity using the normalized cross-correlation is indicated by the following Expression 3.

$$R(x, y, x', y') = \frac{\sum_{i=-M_T}^{M_T} \sum_{j=-N_T}^{N_T} \{I_{(x,y)}(i, j) - \bar{I}\}\{I'_{(x',y')}(i, j) - \bar{I}'\}}{\sqrt{\sum_{i=-M_T}^{M_T} \sum_{j=-N_T}^{N_T} \{I_{(x,y)}(i, j) - \bar{I}\}^2} \sqrt{\sum_{i=-M_T}^{M_T} \sum_{j=-N_T}^{N_T} \{I'_{(x',y')}(i, j) - \bar{I}'\}^2}}$$ (Expression 3)

where $$\bar{I} = \frac{1}{M_T N_T} \sum_{i=-M_T}^{M_T} \sum_{j=-N_T}^{N_T} I_{(x,y)}(i, j),$$

$$\bar{I}' = \frac{1}{M_T N_T} \sum_{i=-M_T}^{M_T} \sum_{j=-N_T}^{N_T} I'_{(x',y')}(i, j)$$

It should be noted that (x, y) denotes the position of the template 203 in the reference image (I) 201, and (x', y') denotes the position of the region 206 in the search image (I') 202 (for example, coordinates of the central interest point 204). Also, $I_{(x, y)}(i, j)$ denotes coordinates of a pixel in the template 203, and $I'_{(x', y')}(i,j)$ denotes coordinates of a pixel in the region 206.

The motion vector calculation unit 5 calculates all degrees of similarity while shifting the position of the region 206 in the search region 207, and then calculates a motion vector by considering the position of the region 206 for which the highest degree of similarity has been obtained as a corresponding point for the interest point 204. Unless there is any occlusion, the number of motion vectors calculated is equal to the number of interest points 204 set in the reference image 201. A motion vector is expressed by a vector having an interest point in the reference image 201 as an initial point, and a corresponding point in the search image 202 as a terminal point.

$$(x, y, x', y')_i, i=1, \ldots, m$$ (Expression 4)

(m: the number of motion vectors)

Mainly for the purpose of reducing a memory amount, the following expression focusing on changing components of vectors is often adopted for motion vectors.

$$(\Delta x, \Delta y)_i, i=1, \ldots, m, (\Delta x=x'-x, \Delta y=y'-y)$$ (Expression 4')

The motion vector calculation unit 5 may also search for a peak position of degrees of similarity with higher accuracy by applying polynomial fitting to correlation scores in the search region 207. The motion vector calculation unit 5 may also calculate motion vectors or loci of corresponding points with sub-pixel precision by, for example, increasing pixel resolutions of the template 203 and the search region 207.

The above has described an example of block matching in which interest points are fixedly arranged in a grid-like pattern. However, it is permissible to extract characteristic points that facilitate calculation of motion vectors from the reference image, and search for motion vectors using the extracted characteristic points as interest points. The interest points can be extracted using an image processing filter such as the Harris operator.

The Harris operator is a matrix used to detect corners of an image. First, a window size W is determined, and a differential image for horizontal and vertical directions ($I_{dx}$, $I_{dy}$) is computed. It is sufficient to use a Sobel filter and the like in computation of the differential image. For example, the differential image ($I_{dx}$, $I_{dy}$) is obtained by applying the following to an image: a 3×3 filter $h_x$ in which three rows of h=[1, $\sqrt{2}$,1]/(2+$\sqrt{2}$) are arrayed in the vertical direction; and a 3×3 filter by in which three columns of h=[1,$\sqrt{2}$,1]/(2+$\sqrt{2}$) are arrayed in the horizontal direction.

Then, for all coordinates (x, y) in the image, the following matrix G is computed using the window W.

$$G = \begin{bmatrix} \sum_W I_x^2 & \sum_W I_x I_x \\ \sum_W I_x I_x & \sum_W I_y^2 \end{bmatrix}$$ (Expression 5)

Characteristic points are extracted in order from coordinates (x, y) with the largest minimum singular value of the matrix G. At this time, it is preferable that the characteristic points are not grouped tightly. In view of this, it is permissible not to calculate characteristic points any more on a periphery of a window size W of coordinates (x, y) for which characteristic points have already been extracted.

In a case where a motion vector is detected using an old frame that was used as a current frame in detecting a motion vector, template matching may be performed by obtaining characteristic points again. However, template matching may be performed using terminal points of a motion vector that was detected earlier (points in an old frame) as an interest point.

Alternatively, association may be performed by implementing table matching using characteristic amounts as key information between characteristic points calculated in each frame. For example, effective association can be performed by utilizing a graph algorithm that can reduce a lengthy association operation.

The change amount calculation unit 6 calculates an amount of deformation between frame images, that is to say, an amount of image change based on camera parameters, on orientational change information of the image capture apparatus obtained from the shake information obtaining unit 3, and on motion vector information obtained from the motion vector calculation unit 5.

Figure 3:
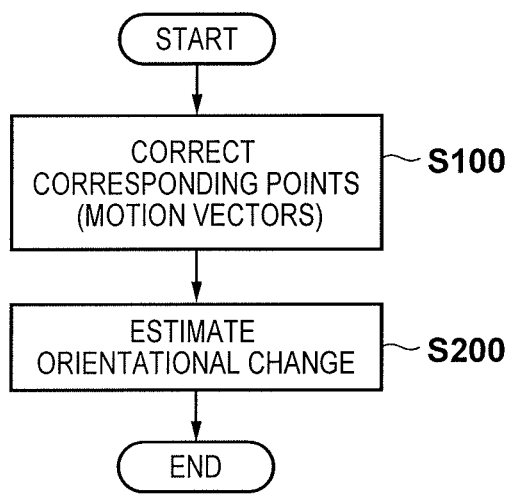
FIG. 3 is a flowchart for describing processing for calculating an amount of image change in an embodiment.

Processing for calculating an amount of image change is executed through the following two steps shown in a flowchart of FIG. 3: a corresponding point (motion vector) correction step (step S100); and an orientational change estimation step (step S200).

In step S100, the change amount calculation unit 6 performs correction by transforming a motion vector obtained from the motion vector calculation unit 5 into corresponding points in an image. Based on orientational change information obtained by the shake information obtaining unit 3, the change amount calculation unit 6 first performs transformation into a coordinate change in an undistorted image obtained by removing a rolling shutter distortion and a skew from each frame image. The change amount calculation unit 6 also cancels a coordinate change caused by a rotational motion of the digital camera 100 around the yaw and pitch axes from the orientational change information, and leaves only an image change caused by a rotational motion around the pitch axis (optical axis) and translation as a coordinate change. An image change caused by a translational motion includes a change in translation in the horizontal and vertical directions, magnification/reduction, and parallax.

Figure 4:
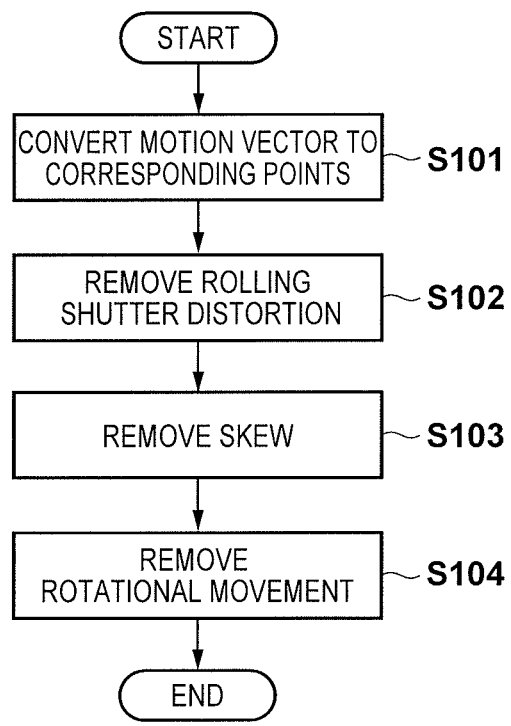
FIG. 4 is a flowchart for describing corresponding point (motion vector) correction processing in an embodiment.

FIG. 4 is a flowchart showing the flow of processing for obtaining information of corresponding points indicating only an image change caused by a translational motion of the digital camera 100 among motion vector information containing distortion.

In the first step S101 of obtaining corresponding points, in a case where input information is a motion vector, the change amount calculation unit 6 collectively obtains coordinate information of interest points used by the motion vector calculation unit 5 in calculation of the motion vector, and performs transformation into corresponding points indicating corresponding positions in each frame image. Specifically, the change amount calculation unit 6 transforms a motion vector $\Delta \vec{x} = (\Delta x, \Delta y)$ into an interest point $\vec{x} = (x,y)$ and a corresponding point $\vec{x}' = (x',y')$ in accordance with Expression 6.

$$\vec{x}' = \vec{x} + \Delta \vec{x} \quad \text{(Expression 6)}$$

While the processing for obtaining corresponding points in step S101 and the subsequent processing may be executed in an image coordinate system, it is preferable to perform transformation into a normalized image coordinate system because the influences of an image size and zoom are significant. The normalized image coordinate system is a non-dimensional space in which image coordinates are normalized with a pixel-based focal length. Therefore, in the actual geometric deformation processing, geometric deformation in the normalized image coordinate system is performed using a determinant $CHC^-$ including a camera parameter matrix C and an inverse transformation matrix $C^-$ thereof, as well as a later-described matrix of coordinate transformation processing, H, interposed therebetween. Alternatively, coordinate calculation is performed by first transforming coordinates of corresponding points as indicated by the following expression.

$$C = \begin{bmatrix} f & 0 & c_x \\ 0 & f & c_y \\ 0 & 0 & 1 \end{bmatrix}, \bar{x}_n = C\bar{x}, \bar{x}'_n = C\bar{x}' \quad \text{(Expression 7)}$$

Here, f denotes a pixel-based focal length, and $C_x$, $C_y$ denote a position of an image center. The suffix n will be omitted below.

Next, in step S102, the change amount calculation unit 6 executes rolling shutter distortion removal processing. Based on inter-frame orientational change information of the digital camera 100 obtained from the shake information obtaining unit 3, the change amount calculation unit 6 removes a rolling shutter distortion caused by a shake of the digital camera 100 from coordinates of corresponding points. It should be noted that, in a case where the shake information obtaining unit 3 detects only a rotational motion of the digital camera 100 around the yaw and pitch axes, the rolling shutter distortion removed here is also distortion components attributed to the rotational motion around the yaw and pitch axes.

The following Expression 8 is a phenomenological expression showing the process of the occurrence of a rolling shutter distortion.

$$\vec{x}' = \vec{x} + \int_{t_1}^{t} m(\vec{x}; \vec{p}(s))ds, \text{ where } t = y'\tau \approx y\tau, t_1 = y_1\tau \quad \text{(Expression 8)}$$

Here, $\vec{x}'$ denotes image coordinates for the rolling shutter distortion, $\vec{x}$ denotes image coordinates after the rolling shutter correction, and m( ) denotes a spatial motion model function. The second term on the right-hand side denotes a movement in an image caused by a movement of the digital camera that occurs due to a difference $(y-y_1)\tau$ between an exposure period of a reference line $y_1$ and an exposure period of a horizontal line y including a pixel targeted for geometric deformation. Also, $t_1$ denotes a time point of image capture (exposure) for a reference line, t denotes a time point of image capture (exposure) for a horizontal line including a pixel targeted for correction, and $\vec{p}(t)$ denotes a vector amount indicating a motion information parameter.

The spatial motion model function m( ) is a function for expressing a coordinate change in an image from a model parameter $\vec{p}(t)$ in a minute period related to an original image coordinate x and motion. An orientational change around a principal point of the optical system 1, e.g., yaw α and pitch β (and roll γ) indicating a rotation amount, can be used as a motion information parameter. The spatial motion model function m( ) can also model a movement using image registration parameters that can express a global movement in an image, such as translations $t_x$, $t_y$ in the vertical and horizontal directions and a planar rotation θ; as such, the spatial motion model function m( ) is a model that can be widely used.

Furthermore, if the orientational change information obtained from the shake information obtaining unit 3 indicates an orientational change of the digital camera 100 in the yaw and pitch (and roll) directions, Expression 8 can be simplified, that is to say, the function m( ) can be factored out of the integration, as indicated by the following Expression 9.

$$\vec{x} = \vec{x}' - m(\vec{x}; \int_{t_1}^{t} \vec{p}(s)ds) \quad \text{(Expression 9)}$$

Furthermore, with regard to, for example, a rotation of the image capture apparatus in the yaw and pitch directions, only the influences of a rolling shutter distortion related to translational components of an image with a large change amount are taken into consideration. In this case, m(θ) can be expressed as f tan θ. Here, θ is a motion information parameter integrated in an integration period (in the case of information of a rotation orientation sensor, a change in an orientational angle from the time of exposure of a reference row to the time of exposure of a target row). Therefore, a correction expression corresponding to a pixel included in any horizontal line can be expressed as follows.

$$\vec{x}rsc(,l) = \vec{x}'(,l) - f\tan(\int_{t_1}^{t_1}\theta Y(s)ds), -f\tan(\int_{t_1}^{t_1}\theta_P(s)ds)) \quad \text{(Expression 10)}$$

Here, $\vec{x}'$ denotes coordinates of distortion, and $\vec{x}_{rsc}$ denotes a coordinate point obtained by removing a rolling shutter distortion from a corresponding coordinate point including distortion in each image. Removal of a rolling shutter distortion and skew removal processing, which will be described next, are applied to both of an old frame and a current frame of a corresponding point. Here, $\vec{x}'(,l)$ indicates a correction expression for any pixel in a horizontal line of an image height l of a rolling shutter distortion image. That is to say, it indicates that the same correction amount is applied to pixels included in the same horizontal line.

Using a correction expression derived based on interpretation and approximation of a model expression of the above phenomenon, the change amount calculation unit 6 removes the influences of a rolling shutter distortion from coordinate values of corresponding points in each frame. In the present embodiment, a correction expression based on a rotation sensor signal for the yaw and pitch directions is indicated by Expression 10. Expression 10 corrects an image change caused by a change in an orientational angle from the time of exposure of a reference row to the time of exposure of a target row.

Figure 5A:
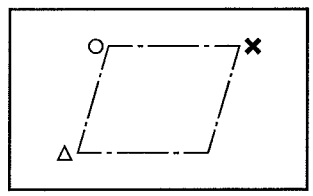
FIGS. 5A to 5C show rolling shutter distortions (RS distortions) caused by rotational motions around yaw and pitch axes, and examples of corrections therefor.
Figure 5A:
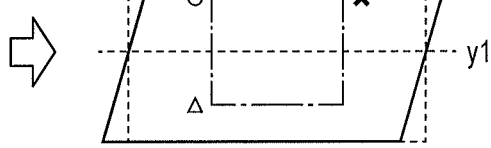
Figure 5B:
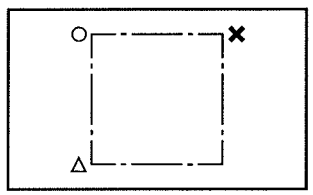
Figure 5B:
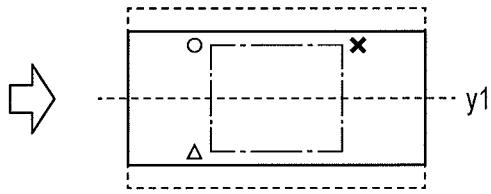
Figure 5C:
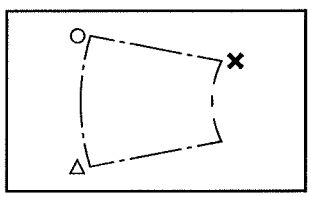
Figure 5C:
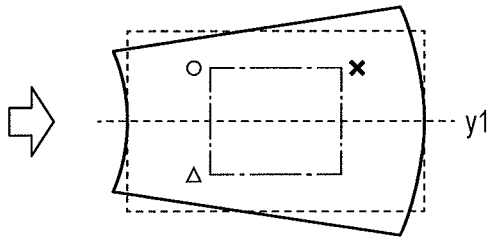

In Expression 10, $\theta_Y(t)$ and $\theta_P(t)$ denote orientational change information of the image capture apparatus for the yaw and pitch directions within a frame period transformed using Expression 2 in accordance with an image height timing of a rolling shutter. In a case where a sampling position of the $\theta_x(t)$ function is midway between sampling positions of existing sensor data, the orientational change information is generated by making use of, for example, prediction, interpolation, and hold techniques as described earlier. FIGS. 5A and 5B show rolling shutter distortions (RS distortions) caused by rotational motions around the yaw and pitch axes, and examples of corrections therefor. In FIGS. 5A to 5C, y1 is a reference image height determined in an arbitrary manner. Pixels at the reference image height do not move because a correction amount thereof is zero.

Next, in step S103, the change amount calculation unit 6 executes skew correction processing for removing the influences of a skew from the coordinate information $\vec{x}_{rsc}$ from which the rolling shutter distortion has been removed. Skew correction is processing for correcting a radial distortion and a distortion caused by aberration of the optical system, such as transverse chromatic aberration, through geometric deformation, and mainly corrects a radial distortion. First, the change amount calculation unit 6 obtains image capture parameters such as a focal length, an in-focus distance, and an aperture value of the optical system 1. Then, the change amount calculation unit 6 obtains skew correction information as a geometric deformation parameter from a skew correction information retaining unit in the change amount calculation unit 6, which retains the skew correction information in a form that enables search for a focal length, an in-focus distance, and an aperture value as indexes. The geometric transformation parameter may be, for example, a table showing a skew rate output from design data of the optical system 1, or a ratio between an ideal image height and a skewed image height, which is a modified form of the skew rate.

The following describes the details of coordinate calculation for correction based on an exemplary case in which a table showing a ratio between an ideal image height and a skewed image height is used as the geometric transformation parameter. Efficient coordinate calculation for skew correction can be performed by transforming input coordinates into polar coordinates in reference to the center of transformation (reference coordinates for coordinate transformation) $X_{0d}$, $Y_{0d}$. Geometric correction for coordinates can be expressed by Expression 11. Highly accurate correction can be performed with use of an image center as the center of transformation $X_{0d}$, $Y_{0d}$.

$$r_d = \sqrt{(X'_d - X_{0d})^2 + (Y'_d - Y_{0d})^2} \qquad \text{(Expression 11)}$$

$$r_n = r_d / f(r_d)$$

$$\begin{bmatrix} X_{dc} \\ Y_{dc} \end{bmatrix} = \frac{r_n}{r_d} \begin{bmatrix} X'_d - X_{0d} \\ Y'_d - Y_{0d} \end{bmatrix} + \begin{bmatrix} X_{0d} \\ Y_{0d} \end{bmatrix}$$

Here, f(r) denotes an operation for extracting a ratio between an ideal image height and a skewed image height through interpolation from the aforementioned table using the skewed image height as an argument. The third expression denotes an operation for performing coordinate transformation on Cartesian coordinates using a correction amount obtained from polar coordinates.

FIGS. 6A to 6C show examples of skew correction. FIG. 6A shows an original image, and an alternate long and short dash line therein indicates a state in which an image of a quadrilateral subject is captured in a skewed manner. FIG. 6B shows an image obtained as a result of skew correction, in which a subject region has been corrected to a correct shape. FIG. 6C shows an example in which geometric transformation has been performed after moving reference coordinates from central coordinates in the original image (x mark) to central coordinates of the image (black circle) that have been moved through the optical anti-shake operation, in consideration of the influences of the optical anti-shake operation.

In step S104, the change amount calculation unit 6 executes rotational movement removal processing for cancelling a coordinate change of a corresponding point caused by a rotational motion of the digital camera 100, which remaining in an undistorted coordinate space for which a rolling shutter distortion and a skew have been removed. The digital camera 100 in the undistorted coordinate space can be replaced with a pinhole camera model using camera parameters. Therefore, the change amount calculation unit 6 cancels a coordinate change caused by a rotational motion based on the pinhole camera model using an orientational change between frames obtained by the rotation orientation sensor. For example, assuming that a rotational motion of the digital camera 100 is detected only around the yaw and pitch axes, a homography of a geometric deformation parameter is given as shown in Expression 12 using the XYZ Euler angle expression.

$$H = \begin{bmatrix} a & b & c \\ d & e & f \\ g & h & i \end{bmatrix} = \qquad \text{(Expression 12)}$$

$$\begin{bmatrix} \cos(Y) & 0 & \sin(Y) \\ 0 & 1 & 0 \\ -\sin(Y) & 0 & \cos(Y) \end{bmatrix} \begin{bmatrix} 1 & 0 & 0 \\ 0 & \cos(P) & -\sin(P) \\ 0 & \sin(P) & \cos(P) \end{bmatrix}$$

$$Y = rat_{Y\_fr}(j), \ P = rat_{P\_fr}(j)$$

Here, $rat_{x\_fr}(j)$, (x=Y, P) denote a rotation amount of the digital camera 100 around the pitch and yaw axes integrated in a period j between certain frames.

The change amount calculation unit 6 cancels an image change caused by a rotational motion by applying this homography to corresponding points in a normalized image coordinate system. For example, the influences of a rotational motion around the pitch and yaw axes are removed by applying this homography to coordinates in an old frame image.

$$\begin{bmatrix} X'_h \\ Y'_h \\ m \end{bmatrix} = H \begin{bmatrix} X_r - X_{0h} \\ Y_r - Y_{0h} \\ 1 \end{bmatrix} + \begin{bmatrix} X_{0h} \\ Y_{0h} \\ 0 \end{bmatrix}, \begin{bmatrix} X''_h \\ Y''_h \end{bmatrix} = \begin{bmatrix} X'_h/m \\ Y'_h/m \end{bmatrix} \quad \text{(Expression 13)}$$

Here, $X_{0h}, Y_{0h}$ are terms specifying the center of transformation (reference coordinates of geometric transformation). This is not necessary in transformation performed using an image center as the origin.

A schematic description of the rotational movement removal processing will now be given with reference to FIGS. 7A to 7C. Assume a state in which the digital camera 100 that captures a frontal image of a square subject has rotated in the left yaw direction relative to the subject, as shown in FIG. 7A. As a result, an old frame image in a pre-rotation state shown on the left side of FIG. 7B changes into a current frame image shown on the right side of FIG. 7B. That is to say, in the image, the subject moves to the right and becomes displaced from the correct position, and the shape of the subject visibly changes due to projection.

Here, in the current frame image, a corresponding point for an interest point $x_i$ in the old frame image is $x_{i'}$. Therefore, in the rotational movement removal processing of step S104, the change amount calculation unit 6 transforms an interest point coordinate $x_i$ in the old frame image using the homography of Expression 12, and obtains a coordinate $\vec{x}_i''$ shown in FIG. 7C for which a coordinate movement caused by the rotational motion has been removed. Looking from a different perspective, processing for obtaining $\vec{x}_i''$ by adding a rotational image change caused by a rotational motion of the digital camera 100 to the interest point $x_i$ in the old frame is executed.

By executing the corresponding point (motion vector) correction step (step S100) described above, the change amount calculation unit 6 can obtain a corresponding point for which the influences of a rolling shutter distortion, a skew distortion, and a displacement caused by a rotational motion of the digital camera 100 have been removed. In the case of a still scene, a movement between corresponding points mainly includes only an image displacement caused by a translational motion of the digital camera 100 and an image displacement caused by parallax.

Next, in step S200, the change amount calculation unit 6 executes orientational change estimation processing for estimating an orientational change of the digital camera 100 between a current frame and an old frame based on input corrected corresponding points between these frames. The change amount calculation unit 6 executes the orientational change estimation processing based on information of corresponding points for which the influences of a distortion and the influences of a rotational motion of the digital camera 100 have been removed after transformation into values in the normalized image coordinate system in the corresponding point (motion vector) correction step of step S100.

In geometric deformation processing executed later, an anti-shake operation for an image is performed through projective transformation; therefore, here, parameters for an orientational change of the digital camera 100 related to an image change with degrees of projective freedom, or for a resultant image change, are estimated. A relationship between an orientational change of the digital camera 100 related to degrees of projective freedom and an image change can be expressed by the following Expression 14.

$$H = \lambda \left( R + \frac{1}{d} \vec{t} \vec{n}^T \right) \quad \text{(Expression 14)}$$

Figure 8A:
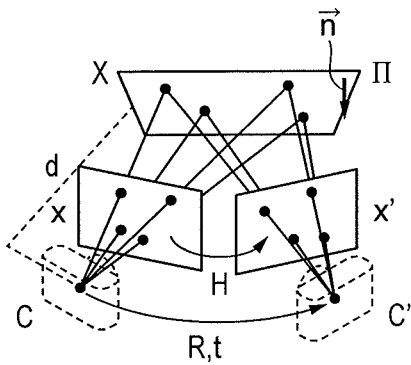
FIGS. 8A to 8C are diagrams for describing geometric meanings of processing for calculating orientational change parameters.
Figure 8B:
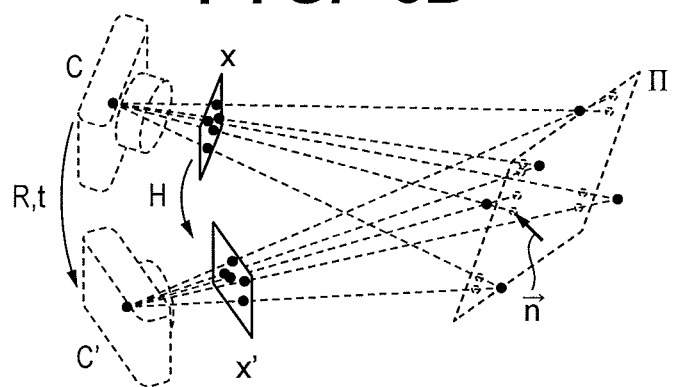
Figure 8C:
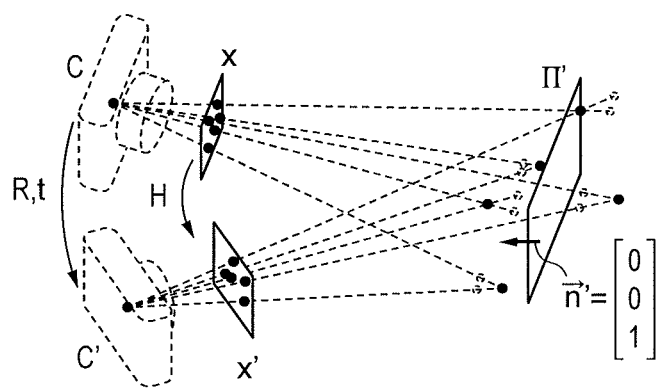

Here, R, $\vec{t}$ denote movements of the digital camera 100 in the rotational and translational directions, d denotes a distance to a reference plane, $\vec{n}$ denotes a normal to the reference plane away from the digital camera 100, and λ denotes an arbitrary constant quantitatively representing a magnitude of a distance d on a spatial plane in the case of calculation between two images. FIGS. 8A to 8C schematically show geometric meanings of these parameters.

Here, a ratio between a norm of $\vec{t}$ and a value of d cannot be uniquely obtained from two frame images. In view of this, $\vec{t}$ is treated as a unit direction vector norm($\vec{t}$)=1 indicating a translational direction, and d is treated as the product of a distance to the spatial plane and a magnitude of a translation amount. FIG. 8A shows this geometric relationship. Corresponding points $\vec{x}_i \Leftrightarrow \vec{x}_i'$ denote images captured from a viewpoint C of an old frame and a viewpoint C' of a current frame. At this time, if $\vec{x}_i \Leftrightarrow \vec{x}_i'$ are all points X on a plane Π in a space, an image change caused by a rotational motion R and a translational motion $\vec{t}$ of the digital camera 100 can be uniquely expressed by H of Expression 12.

That is to say, an image change between corresponding points representing projection of points X on the plane Π onto each captured image can be explained using the following expression. It should be noted that $\bar{x}_i, \bar{x}_i'$ denote three-element vector values obtained by transforming each corresponding point into homogeneous coordinates.

$$\bar{x}_i' = H \bar{x}_i \quad \text{(Expression 15)}$$

Here, the plane Π in a space is defined by a distance d from coordinates in an old frame modeled by the pinhole camera and a normal $\vec{n}$.

In the orientational change estimation processing, R, $\vec{t}$, $\vec{n}$, d, which are parameters for H, are obtained through estimation processing using a difference pertaining to mapping of one of corresponding points through geometric transformation as the following error function.

$$\varepsilon = \sum_i |\bar{x}_i' - H\bar{x}| = \sum_i \left| \bar{x}_i' - \left( R + \frac{1}{d}\vec{t}\vec{n}^T \right) \bar{x}_i \right|, \quad \text{(Expression 16)}$$

$$\{R, \vec{t}, \vec{n}, d\}_{best} = \underset{\{R,\vec{t},\vec{n},d\}}{\operatorname{argmin}}(\varepsilon)$$

In the error function expression, ‖ denotes a norm of a vector. The change amount calculation unit 6 obtains R, $\vec{t}$, $\vec{n}$, d that minimize the error function through arbitrary estimation processing. While the $L_1$ norm method has been illustrated for the error function, the $L_2$ norm method may be used. Specifically, R, $\vec{t}$, $\vec{n}$, d may be obtained by directly applying multivariable non-linear estimation processing to Expression 16. Alternatively, a combination of general estimation methods may be used; for example, R, $\vec{t}$ may be obtained first through orientation estimation based on epipolar estimation, and then $\vec{n}$, d may be obtained by applying trigonometry to the corresponding points $\vec{x}_i \Leftrightarrow \vec{x}_i'$ and obtained R, $\vec{t}$.

$$\{R, \vec{t}, \vec{n}, d\}_{best} = \underset{\{\vec{n},d\}}{\mathrm{argmin}}\left(\underset{\{R,\vec{t}\}}{\mathrm{argmin}}(\varepsilon)\right) \quad \text{(Expression 17)}$$

However, in a general scene, spatial points X targeted for calculation of the corresponding points $\vec{x}_i \Leftrightarrow \vec{x}_i'$ are not always conveniently set on an arbitrary spatial plane, and the possibility of such convenient setting is rather low. Therefore, the plane Π is more generally defined as an enveloping plane of spatial points X as shown in FIG. 8B.

However, in view of a change in distribution of corresponding points in a time direction, distribution of spatial points X that enables obtainment of the corresponding points $\vec{x}_i \Leftrightarrow \vec{x}_i'$ depends on the position of the subject and on the method for calculating a motion vector, and therefore changes moment by moment. That is to say, the orientation $\vec{n}$ of the plane Π easily changes in an unstable manner in the time direction, with the result that a position in an image that achieves excellent anti-shake effects could possibly change moment by moment without the intention of a photographer.

This problem can be solved by defining the orientation $\vec{n}$ of the plane Π in parallel to an imaging plane from an old viewpoint C of the digital camera 100 (that is to say, $\vec{n}'=[0\ 0\ 1]^T$), as shown in FIG. 8C. In accordance with this definition, the estimation expression indicated by Expression 16 can be rewritten into a simpler form as follows.

$$\varepsilon = \sum_i \left| \vec{x}_i' - \left( R + \frac{1}{d}\begin{bmatrix} 0 & 0 & t_x \\ 0 & 0 & t_y \\ 0 & 0 & t_z \end{bmatrix}\right)\vec{x}_i \right|, \quad \text{(Expression 18)}$$

$$\{R, \vec{t}, d\}_{best} = \underset{\{R,\vec{t},d\}}{\mathrm{argmin}}(\varepsilon)$$

By using this definition, the plane Π serving as a reference plane for the anti-shake operation is no longer an enveloping plane of spatial points X as shown in FIG. 8C. This could possibly lead to an increase in a value of the error function, but fixes the reference plane for the anti-shake operation in the time direction, thereby advantageously enabling stable calculation of an amount of image change for use in the anti-shake operation.

In addition to the aforementioned definition of the plane Π, provided that the influences of a rotational motion of the digital camera 100 on corresponding points have been removed through the skew removal processing except for the influences of a rotational motion around the roll axis (R=Rz (φ)), an orientation estimation expression can be further simplified as follows.

$$\varepsilon = \sum_i \left| \vec{x}_i' - \left(\begin{bmatrix} \cos\varphi & -\sin\varphi & t_x/d \\ \sin\varphi & \cos\varphi & t_y/d \\ 0 & 0 & 1-t/d_z \end{bmatrix}\right)\vec{x}_i \right| = \quad \text{(Expression 19)}$$

$$\sum_i \left| \vec{x}_i' - \left(\begin{bmatrix} s\cdot\cos\varphi & -s\cdot\sin\varphi & t_x' \\ s\cdot\sin\varphi & s\cdot\cos\varphi & t_y' \\ 0 & 0 & 1 \end{bmatrix}\right)\vec{x}_i \right|$$

$$\{\varphi, s, t_x', t_x'\}_{best} = \underset{\{\varphi,s,t_x',t_x'\}}{\mathrm{argmin}}(\varepsilon)$$

It should be noted that the following and homogeneous properties are used in expression transformation.

$$s=1/(1-t/d_z), t_x'=t_x/d(1-t_z/d), t_y'=t_y/d(1-t_z/d)$$

Here, it is apparent that Expression 19 is an estimation expression for a general Helmert transformation (similarity transformation) parameter. Therefore, remaining parameters for an image change can be estimated by obtaining an image change caused by a rotational motion of the digital camera 100 around the roll axis (optical axis) and a translational motion toward an axial direction vertical to the optical axis using, for example, a method of least squares. Here, s denotes magnification/reduction, θ denotes planar rotation, $t_x'$ denotes horizontal translation, and $t_y'$ denotes vertical translation. In the following description, restoration is performed, resulting in $t_x' \to t_x$, $t_y' \to t_y$.

The product H' of the homography expressing rotation used in the correction processing and the homography of the Helmert parameter for the digital camera 100 thus calculated indicates an image change between frame images with degrees of projective freedom. This is equivalent to a parameter for a movement caused by an orientational change of the digital camera 100 with six-axis degrees of freedom. In this way, a homography expressing an image change between frames other than parallax can be obtained. H' can be expressed by the following Expression 20.

$$H' = \begin{bmatrix} s\cdot\cos\varphi & -s\cdot\sin\varphi & t_x \\ s\cdot\sin\varphi & s\cdot\cos\varphi & t_y \\ 0 & 0 & 1 \end{bmatrix}\begin{bmatrix} \cos(\alpha Y) & 0 & \sin(\alpha Y) \\ 0 & 1 & 0 \\ -\sin(\alpha Y) & 0 & \cos(\alpha Y) \end{bmatrix} \quad \text{(Expression 20)}$$

$$\begin{bmatrix} 1 & 0 & 0 \\ 0 & \cos(\alpha P) & -\sin(\alpha P) \\ 0 & \sin(\alpha P) & \cos(\alpha P) \end{bmatrix}$$

That is to say, in a case where a rotation amount of the digital camera 100 around the yaw and pitch axes is already known and the normal $\vec{n}$ of the reference plane Π for the anti-shake operation can be defined in parallel to an imaging plane from a viewpoint C of an old frame as in the present embodiment, estimation of a parameter for an image change with degrees of projective freedom from corresponding points can be simplified to a great extent.

A parameter for a homography of degrees of projective freedom can be directly estimated; in this case, however, fine calculation performed for the reference plane Π in the above-described calculation of an amount of image change cannot be performed, thereby reducing the quality of estimation of an image change for use in the anti-shake operation. The following Expression 21 is the estimation expression.

$$\varepsilon = \sum_i |\overline{x}'_i - H\overline{x}_i| = \sum_i \left| \overline{x}'_i - \begin{bmatrix} h_{11} & h_{12} & h_{13} \\ h_{21} & h_{22} & h_{23} \\ h_{31} & h_{32} & h_{33} \end{bmatrix} \overline{x}_i \right|, \quad \text{(Expression 21)}$$

$$\{h_{11}, \ldots, h_{33}\}_{best} = \operatorname*{argmin}_{\{h_{11}, \ldots, h_{33}\}} (\varepsilon)$$

While a detailed estimation method is omitted as it is known, there are two additional problems. One problem is that, as all parameters are directly estimated from an image vector including an image change related to projection, there is sensitivity to the influences of erroneous correspondence in corresponding points and the influences of sparseness and tightness of distribution of corresponding points, and erroneous estimation easily occurs. The other problem is that the homogeneous expression requires a large amount of calculation including iterative calculations, such as the Jacobi method.

A method for estimating an optimal parameter in the second term of Expression 19 will be described below. It is assumed that normalized image coordinates in an old frame are $(x_i, y_i)$, normalized image coordinates in a current frame are $(x_i', y_i')$, and $i=1, \ldots, m$ (m being the number of corresponding points). In this case, a liner transformation expression for image coordinates using the Helmert nomography can be expressed by an inhomogeneous expression as in Expression 22.

$$\begin{bmatrix} x' \\ y' \end{bmatrix} = \begin{bmatrix} A & -B \\ B & A \end{bmatrix} \begin{bmatrix} x \\ y \end{bmatrix} + \begin{bmatrix} C \\ D \end{bmatrix} \quad \text{(Expression 22)}$$

Here, by transforming the transformation expression, an estimation expression indicated by Expression 23 can be created.

$$\begin{bmatrix} x_i & y_i & 1 & 0 \\ y_i & -x_i & 0 & 1 \\ \vdots & \vdots & \vdots & \vdots \\ x_n & y_n & 1 & 0 \\ y_n & -x_n & 0 & 1 \end{bmatrix} \begin{bmatrix} A \\ B \\ C \\ D \end{bmatrix} = \begin{bmatrix} x_i' \\ y_i' \\ \vdots \\ x_n' \\ y_n' \end{bmatrix} \quad \text{(Expression 23)}$$

A solution is obtained through expression transformation for simplifying the expression, that is to say, by multiplying a transposed matrix $E^T$ of a coefficient matrix E on the left-hand side from the left.

$$E^T E = \begin{bmatrix} A \\ B \\ C \\ D \end{bmatrix} = E^T \begin{bmatrix} x_i' \\ y_i' \\ \vdots \\ x_n' \\ y_n' \end{bmatrix} \quad \text{(Expression 24)}$$

The following is obtained by calculating the coefficient matrix in accordance with Expression 24.

$$\begin{bmatrix} a & 0 & b & c \\ 0 & a & -c & b \\ b & -c & n & 0 \\ c & b & 0 & n \end{bmatrix} \begin{bmatrix} A \\ B \\ C \\ D \end{bmatrix} = \begin{bmatrix} d \\ e \\ f \\ g \end{bmatrix} \quad \text{(Expression 25)}$$

Here, a to g are as follows.

$$a = \sum_i^n x_i^2 + y_i^2 \quad \text{(Expression 26)}$$

$$b = \sum_i x_i$$

$$c = \sum_i y_i$$

$$d = \sum_i x_i x_i' + y_i y_i'$$

$$e = \sum_i y_i x_i' + y_i y_i'$$

$$f = \sum_i x_i'$$

$$g = \sum_i y_i'$$

While the estimation expression can be solved as-is, an amount of computation can be reduced by further solving, in advance, an estimation expression that has been simplified in an inhomogeneous manner through correction of corresponding points. In this case, by solving Expression 25 in advance, a solution of an equation can be obtained through the following computations.

$$A = \frac{b*f + c*g - n*d}{denom} \quad \text{(Expression 27)}$$

$$B = \frac{c*f + b*g - n*e}{denom}$$

$$C = \frac{-a*f + b*d - c*e}{denom}$$

$$D = \frac{-a*g + c*d - b*e}{denom}$$

where $denom = b^2 + c^2 - n*a$

Here, n denotes a score.

Due to the following relationships representing the Helmert properties, a parameter for an image change with affine degrees of freedom caused by rotation θ of the digital camera 100 around the optical axis (pitch axis), magnification/reduction s, and translations $t_x$, $t_y$ can be calculated.

$$s = \sqrt{A^2 + B^2}, \theta = \tan^{-1}(B/A), t_x = C, t_y = D \quad \text{(Expression 28)}$$

Here, $t_x$ denotes horizontal translation, and $t_y$ denotes vertical translation.

In the actual calculation, corresponding points are sequentially input, and only above-listed a to g are first computed in accordance with Expression 26 through low-load calculations of addition and multiplication. In the end, solutions of A to D can each be obtained by summation and single division. Here, a calculation load of the estimation expression is large because it is necessary to solve n four-coefficient equations and a large number of divisions are performed. However, as described above, by solving the mathematical expression in advance, solutions of orientation estimation A to D can be analytically obtained only through simple sequential multiply-accumulate calculations as well as four divisions.

As described above, a method for estimating an image change with degrees of projective freedom by combining orientation estimation for the image capture apparatus with depth estimation using trigonometry is problematic in that estimation is complicated and computation algorithms are massive. On the other hand, a method for directly estimating a projection matrix is problematic in that it is not suited for use in an anti-shake operation as a plane in a space serving as a reference for estimation easily becomes unstable due to distribution of calculated positions of corresponding points. Such influences are significant especially when the number of corresponding points is small; this is a severe problem when real-time processing is required as in anti-shake processing at the time of capturing moving images. Furthermore, as they are both estimations between corresponding points including projection components of an image change, estimated values easily become unstable if projection components are large.

On the other hand, the following two advantages are achieved by a method for estimating a parameter for an image change with degrees of projective freedom using a combination of the corresponding point correction step (step S100) and the orientational change estimation step (step S200) as in the present embodiment.

One advantage is that, unlike direct estimation of a projection homography, estimation can be performed in consideration of the reference plane n in a space, similarly to a method based on orientation estimation. The other advantage is that, by including the corresponding point correction step, only a parameter for an image change remaining between frames and caused by a translational motion of the digital camera 100 that cannot be detected by the rotation orientation sensor is estimated from a motion vector. Therefore, fitting to an affine motion, with which estimation is easily concluded, is possible even in the case of a motion vector obtained between images showing significant influences of a rotational motion around the yaw and pitch axes, and images showing the influences of a skew and a rolling shutter distortion. As a result, calculation required for estimation processing is simple, real-time processing is enabled, and a highly accurate parameter for an image change can be obtained.

The correction amount calculation unit 7 processes amounts of deformation between frame images output by the change amount calculation unit 6 in chronological order, and calculates amounts of geometric deformation for the anti-shake operation in consideration of a degree of shake reduction and a margin amount of geometric deformation, that is to say, correction amounts. It should be noted that orientational change information obtained from the shake information obtaining unit 3 may be transformed into amounts of orientational change in a frame cycle (sampling period) using Expression 2, and the transformed amounts may be used as a part of amounts of deformation between frame images.

In order to obtain correction amounts, the correction amount calculation unit 7 processes amounts of deformation between frame images as change loci by applying integration filtering thereto.

Figure 9A:
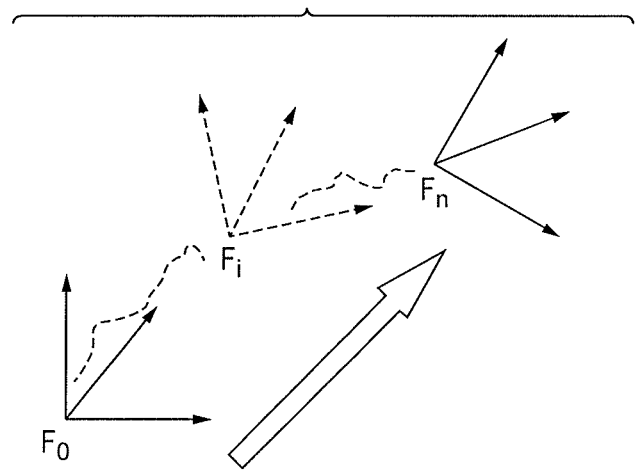
FIGS. 9A and 9B schematically show gradual integration of orientational changes on a per-frame period basis.
Figure 9B:
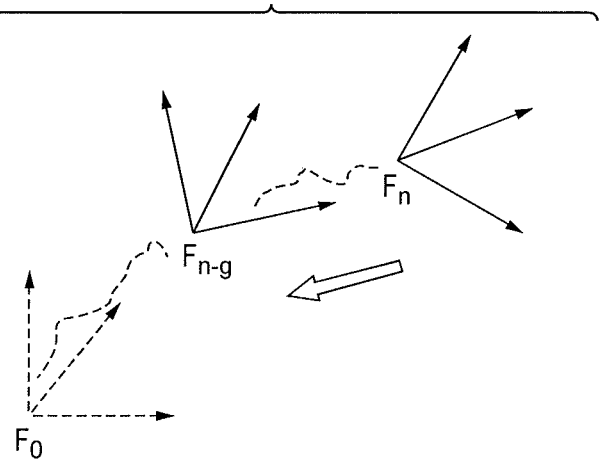

First, the concept of locus processing will be described with reference to FIGS. 9A and 9B. FIG. 9A schematically shows a method for treating loci in reference to an initial frame $F_0$ for use in general positioning (registration). In reference to the initial frame $F_0$, an orientational change in each frame can be numerically expressed up to a current frame $F_n$.

However, for use in the anti-shake operation, orientational changes cumulated from the initial frame are not always necessary, and the cumulation may adversely trigger deterioration in accuracy, unlike the use in registration. For this reason, as shown in FIG. 9B, only change loci in a most recent fixed period (a period from the current frame F, to a frame $F_{n-g}$ newer than the initial frame $F_0$) are retained. Only high-frequency components that are determined to be a shake from a standpoint of the current frame $F_n$ are treated as correction amounts.

There is an issue of which parameter to use as a base for projection in chronological processing for amounts of image deformation between frames. This is because while the homographies H' of an image change between frames representing a six-degree-of-freedom movement of the digital camera 100 can express a cumulative change between frames through multiplication, they make extraction of high-frequency components that are determined to be a shake difficult. The following Expression 29 expresses a cumulative change from a reference frame to a current frame using the product of the homographies H'.

$$H'_{int\_n} = H'_n \ldots H'_i \ldots H'_2 H'_1 \qquad \text{(Expression 29)}$$

In view of this, there is a method (1) for dividing the homographies H' into orientational changes of the digital camera 100 related to rotation R and translation T, treating R as quaternions, calculating a locus with no shake using spherical harmonics and the like, and obtaining a shake (=correction amounts) from a difference. Furthermore, it is also possible to use a method (2) for decomposing the homographies into image change components and processing the image change components in chronological order, as described in Japanese Patent Laid-Open No. 2008-259076. Japanese Patent Laid-Open No. 2008-259076 describes a method for managing changes between frames in a fixed period using a FIFO memory, and selecting high-frequency components of a movement (target of correction=shake) using an FIR filter.

In the present embodiment, information related to a rotational motion of the digital camera 100 is obtained from the shake information obtaining unit 3, and information of an image change related to a translational motion (a parameter for an image change) is obtained by the change amount calculation unit 6. Therefore, chronological filtering processing is applied to each piece of information. For example, the anti-shake operation may be performed by integrating an obtained parameter for an image change between frames using an IIR-type LPF such that each frame image is registered into an orientational state of the digital camera 100 at a certain time point in the past.

$$[\text{Int}_i(j), \text{buf}] = ii r \text{LPF}(\Delta \text{elem}_{x\_fi}(j), \text{buf})(x\!:\!Y\!,P(,R),s,\theta,t_x, t_y)$$

Expression 30 represents calculation of the IIR-type LPF filter used in the integration. A cutoff frequency is set to be lower than that for the case of the optical anti-shake operation. If the feedback gain of the IIR filter is increased, the past state is strongly maintained, and therefore the state of the initial frame $F_0$ is maintained as shown in FIG. 9A. As described above, in the present embodiment, a margin for geometric deformation is attained by performing integration up to the frame $F_{n-g}$ that precedes the current frame by a certain extent. Therefore, the correction amount calculation unit 7 sets a relatively low feedback gain of the IIR filter used in the integration, performs integration of orientations/angular velocities so as to discard orientations in the past little by little, and calculates an orientational/angular change targeted for correction through geometric deformation (a correction amount). According to the method of the present embodiment, calculation is simple compared to the method described in Japanese Patent Laid-Open No. 2008-259076 using the FIR filter, and a correction amount can be obtained while reducing an amount of a used memory. Such calculation makes it possible to obtain shake correction amounts (shake correction parameters) $Y(j)$, $P(j)$, $s(j)$, $\theta(j)$, $t_x(j)$, $t_y(j)$.

The correction amount calculation unit 7 also calculates an amount of rolling shutter distortion correction based on the orientational change information of the digital camera 100 obtained from the shake information obtaining unit 3, and calculates a distortion correction amount for correcting optical aberration from camera parameters.

The amount of rolling shutter distortion correction can be obtained based on the premise of a mapping expression indicated by the following Expression 31. In reference to a row $y_1$ of an image height including reference coordinates, the correction amount calculation unit 7 calculates, for each row in frame images and for each of the pitch and yaw axes, correction amounts by integrating orientational changes from the reference row $y_1$ and changes in a translation amount caused by the optical anti-shake operation. The correction amount calculation unit 7 outputs the calculated correction amounts to the deformation processing unit 8.

$$\Delta X(l,j) = \int_{t_l}^{t'_l} f \tan \theta_Y(s) ds$$

$$\Delta Y(l,j) = \int_{t_l}^{t'_l} f \tan \theta_P(s) ds, \theta_x(t) = rat_{x\_rsc}(t), x = Y, P(,R) \quad \text{(Expression 31)}$$

Furthermore, with regard to a rolling shutter distortion in the roll direction, assuming that a change between frames has an equal speed, an approximate correction amount is calculated from $\theta(j)$, and a value calculated by dividing $\theta(j)$ by an image height h is obtained as a correction amount $\theta R(s)$ (Expression 32).

$$\Delta \Theta(l,j) = \int_{t_l}^{t'_l} \theta_R(s) ds, \theta_R(s) = \theta(j)/h \quad \text{(Expression 32)}$$

It should be noted that, if backward mapping is performed, it is necessary to reconstruct parameters by mapping data arrangement of $\Delta X$, $\Delta P$, $\Delta \Theta$. Furthermore, regarding the skew correction, skew correction information is obtained from the skew correction information retaining unit in the change amount calculation unit 6 using camera parameters such as a focal length, an aperture, and a subject distance (an in-focus distance) of each time point as indexes. As stated in the description of step S103, the skew correction information is a coefficient of a higher-order correction function that is calculated in advance from design values of the optical system and stored in the change amount calculation unit 6.

In order to perform geometric transformation using a backward method in association with the skew removal of step S103 using Expression 11, distortion parameters should be an inverse table of those used in Expression 11. That is to say, an additional table for returning an image height ratio of a skewed image height $r_d$ to an ideal image height $r_n$, which serves as an index, is necessary.

The correction amount calculation unit 7 also executes edge processing for controlling the extent of the anti-shake operation and for restricting a correction amount such that an image fits within a secured margin after geometric deformation. For example, check coordinates are set at a peripheral portion of an image, and parameters for correction amounts are restricted such that the check coordinates remain in an image after transformation. Edge processing is not necessary when a sufficiently large region is secured as a margin, and when the extent of the anti-shake operation is not controlled.

Through the above-described processing, the correction amount calculation unit 7 obtains correction amounts for each component (a skew correction parameter $f(r_n)$ and shake correction parameters ($Y(j)$, $P(j)$, $s(j)$, $\theta(j)$, $t_x(j)$, $t_y(j)$)) and rolling shutter distortion correction parameters ($\Delta X$, $\Delta Y$, $\Delta \Theta$) from the amounts of image change output by the change amount calculation unit 6.

Then, based on these correction amounts, the deformation processing unit 8 performs skew correction, rolling shutter distortion correction, and shake correction by applying geometric transformation to an output image from the preprocessing unit 4. As described above, a shake correction parameter is an amount of geometric deformation for the anti-shake operation obtained by applying filtering processing to components of an exact inter-frame orientational change of the image capture apparatus or components of an image change obtained by the shake information obtaining unit 3 and the change amount calculation unit 6. For example, it is an integrated value of high-frequency components of movements and components of movements up to a current time point in reference to an arbitrary time point in the past excluding the high-frequency components.

The deformation processing unit 8 according to the present embodiment realizes skew correction, rolling shutter distortion correction, and shake correction as anti-shake processing through geometric deformation. Furthermore, in the present embodiment, the deformation processing unit 8 executes geometric transformation processing using backward mapping, in which pixels in an input image are sampled and interpolated based on post-deformation image coordinates, such that an image does not include defective pixels after the geometric deformation. That is to say, the deformation processing unit 8 performs sampling based on pixel coordinates of the input image, and generates data of output pixels through interpolation. At this time, pixel values near calculated sampling coordinates in the input image are used in accordance with an interpolation method. Interpolation methods that can be applied in the interpolation processing include, but are not limited to, bilinear interpolation processing for performing linear interpolation using 4 nearby pixels, and bicubic interpolation processing for performing third-order interpolation using 16 nearby pixel values.

Figure 13:
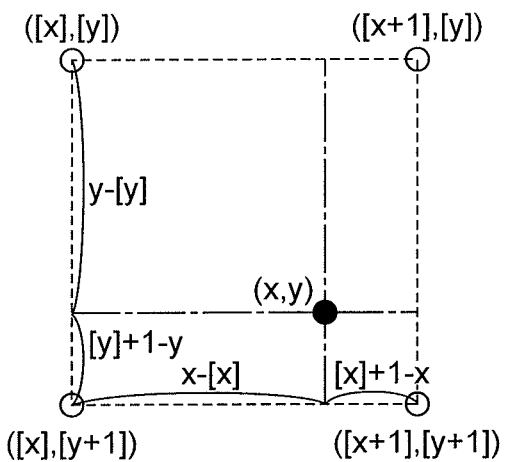
FIG. 13 is a diagram for describing bilinear interpolation, which is one example of typical interpolation methods.

Bilinear interpolation, which is one example of typical interpolation methods, will now be described with reference to FIG. 13. In accordance with the result of performing later-described coordinate calculation for output pixels, pixel data of sampling coordinates in an input image is calculated through interpolation of surrounding pixel values. Sampling coordinates have information including fractional parts. In FIG. 13, ● denotes sampling coordinates, and ○ denotes four nearby pixels in an input image (coordinates in [ ] have integer values). In this case, the following Expression 33 is used to calculate a pixel value at the sampling coordinates from the four nearby pixels in accordance with the bilinear interpolation method.

$$I(x,y) = ([x]+1-x)([y]+1-y)f([x],[y]) + ([x]+1-x)(y-[y])f([x],[y]+1) + (x-[x])([y]+1-y)f([x]+1,[y]) + (x-[x])(y-[y])f([x]+1,[y]+1) \quad \text{(Expression 33)}$$

Here, $I(x, y)$ denotes a pixel value generated through interpolation, and $f( )$ denotes a pixel value in the input image. The deformation processing unit 8 generates an output image by executing this interpolation processing sequentially for all pixels in the image after the geometric deformation (output image).

If a plurality of types of corrections are performed through the geometric deformation processing, the order of application of the corrections can be dynamically changed in accordance with a speed of a movement of the camera, a magnitude of aberration of the optical system, and the like. For example, if the movement of the camera is fast, rolling shutter distortion correction, skew correction, and shake correction are performed in this order. A change in the order of geometric deformation is also reflected in the order of calculation for the corresponding point (motion vector) correction processing executed by the change amount calculation unit 6 in step S201. On the other hand, if an amount of aberration of the optical system, e.g., an amount of radial distortion is large, skew correction, rolling shutter distortion correction, and shake correction are performed in this order. It should be noted that, aside from the correction processing, the output image may be cropped, resized, etc. at the end of the geometric deformation processing.

The following describes the substance of the geometric deformation processing executed by the deformation processing unit 8 according to the present embodiment to realize skew correction, rolling shutter distortion correction, and shake correction, that is to say, coordinate calculation. As mentioned above, the present embodiment adopts backward mapping, in which coordinate calculation for realizing correction processing is performed in a reverse order from a processing order, such that an output image does not include defective pixels. Therefore, shake correction, rolling shutter distortion correction, and skew correction will be described below in this order.

In the shake correction, an image shake caused by rotational and translational motions of the camera is corrected through the geometric deformation processing. Based on information indicating an orientational change of the digital camera 100 obtained by the shake information obtaining unit 3, the deformation processing unit 8 calculates an amount of geometric deformation (geometric deformation parameter) with a correction amount (deformation amount) that takes into consideration a margin and a magnitude of correction effects. The deformation processing unit 8 performs the shake correction by applying geometric deformation in accordance with the deformation parameter. Geometric deformation may be, for example, projective transformation, in which case a geometric transformation parameter is given as a 3×3 projective transformation matrix (homography matrix).

For example, assume that the shake information obtaining unit 3 obtains information indicating an orientational change caused by rotation of the digital camera 100 around the axes in the yaw and pitch directions, and there is no need to control a maximum change amount as a sufficient margin is given. In this case, a geometric deformation parameter (homography matrix H) is given by the following Expression 34. The homography matrix H is computed based on shake correction parameters (Y(j), P(j), s(j), θ(j), $t_x$(j), $t_y$(j)). In the following expression, a coordinate transformation expression for geometric transformation is also shown, with omission of a frame-by-frame index (j).

$$H = \begin{bmatrix} a & b & c \\ d & e & f \\ g & h & i \end{bmatrix} = \begin{bmatrix} \alpha s \cdot \cos(\alpha \theta) & -\alpha s \cdot \sin(\alpha \theta) & \alpha t_x \\ \alpha s \cdot \sin(\alpha \theta) & \alpha s \cdot \cos(\alpha \theta) & \alpha t_y \\ 0 & 0 & 1 \end{bmatrix} \quad \text{(Expression 34)}$$

$$\begin{bmatrix} \cos(\alpha Y) & 0 & \sin(\alpha Y) \\ 0 & 1 & 0 \\ -\sin(\alpha Y) & 0 & \cos(\alpha Y) \end{bmatrix} \begin{bmatrix} 1 & 0 & 0 \\ 0 & \cos(\alpha P) & -\sin(\alpha P) \\ 0 & \sin(\alpha P) & \cos(\alpha P) \end{bmatrix}$$

-continued $$H_{stb} = H^{-1}, \begin{bmatrix} X'_{0h} \\ Y'_{0h} \\ m \end{bmatrix} = H_{stb} \begin{bmatrix} X_r - X_{0h} \\ Y_r - Y_{0h} \\ 1 \end{bmatrix} + \begin{bmatrix} X_{0h} \\ Y_{0h} \\ 0 \end{bmatrix},$$

$$\begin{bmatrix} X''_h \\ Y''_h \end{bmatrix} = \begin{bmatrix} X'_h/m \\ Y'_h/m \end{bmatrix}$$

Here, P and Y respectively denote rotations in the pitch and yaw directions with respect to the optical axis, and α denotes a shake reduction rate. It should be noted that α, which is a value that is determined depending on the IIR filter gain of the correction amount calculation unit 7 and on an image margin and varies on a component-by-component basis, is expressed using the same reference sign for all components to simplify the description. Inverse matrix calculation indicates the use of an integrated movement in shake reduction. Also, a negative sign denotes reduction. Also, $X_{0h}$, and $Y_{0h}$ denote the center of geometric deformation (reference coordinates for coordinate transformation).

Figure 14:
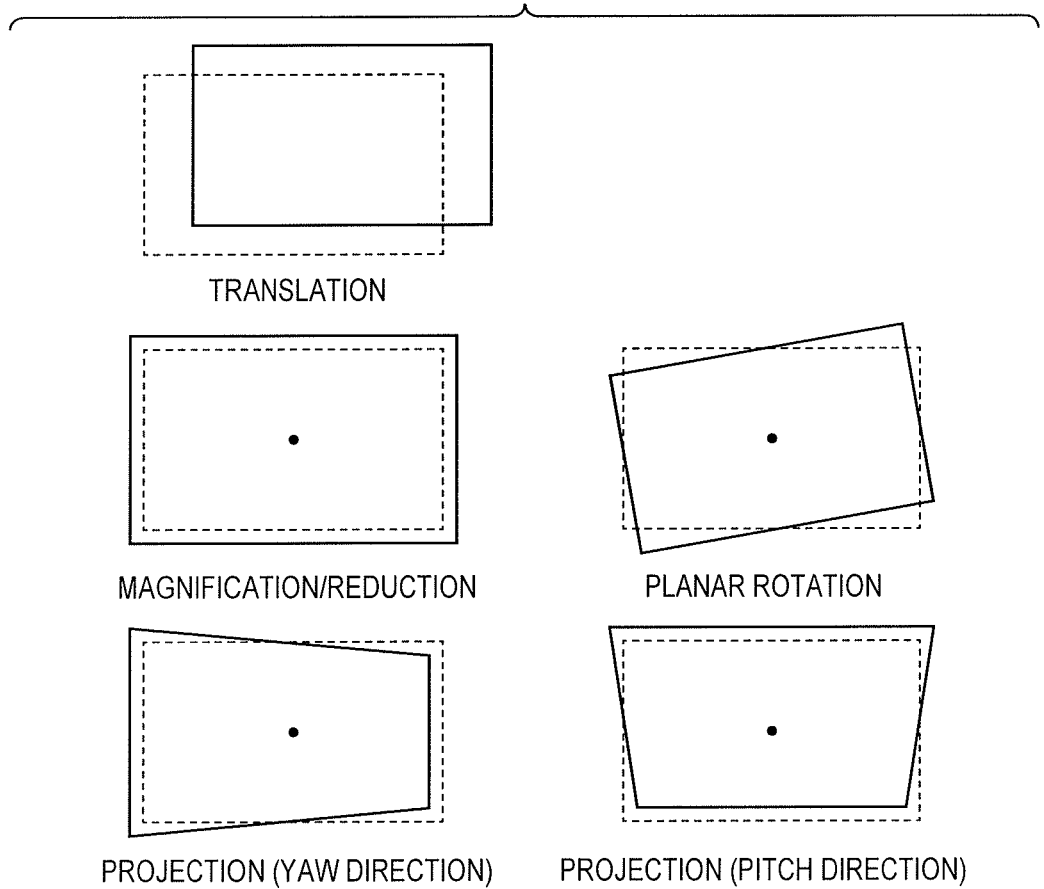
FIG. 14 shows examples of standard geometric deformation used in shake correction.

FIG. 14 shows geometric deformation related to translation, magnification/reduction, planar rotation, and projection directions (yaw and pitch), as examples of standard geometric deformation used in the shake correction. Except for geometric deformation related to translation, the relationship with reference coordinates for geometric deformation, which are indicated by a black circle in FIG. 14, is important. If the digital camera 100 undergoes only a rotational motion and the shake correction is performed using Expression 34 based on orientational change information from the shake information obtaining unit 3, it is necessary to match the reference coordinates for geometric deformation (the center of transformation) with the image center.

Normalized image coordinates are used in the described geometric deformation. For this reason, in the actual deformation processing, geometric deformation is performed using a determinant CHC⁻ for normalization, which includes a camera parameter matrix C indicated by the following Expression 35 and an inverse matrix C⁻ thereof, as well as the nomography matrix H interposed therebetween.

$$C = \begin{bmatrix} f & 0 & 0 \\ 0 & f & 0 \\ 0 & 0 & 1 \end{bmatrix} \quad \text{(Expression 35)}$$

Here, f denotes a focal length of the optical system 1.

A rolling shutter distortion is a distortion of a captured image that occurs upon movement of the camera or subject during an exposure period for a single captured image (frame) in a case where an image sensor that performs exposure at different timings between scan lines (horizontal pixel lines) is used. This distortion is corrected through geometric deformation in the rolling shutter distortion correction. Examples of the rolling shutter distortion are shown on the left side of FIGS. 5A to 5C. FIGS. 5A, 5B and 5C respectively show examples of rolling shutter distortions that occur when the camera undergoes a constant-velocity motion in the yaw, pitch and roll directions during an exposure period. The examples of distortions in the yaw and pitch directions are similar to twisting caused by a translational movement of the camera in horizontal and vertical directions. In accordance with a geometric deformation parameter that the correction amount calculation unit 7 has calculated from orientational change information obtained by the orientation sensor of the shake information obtaining unit 3, the deformation processing unit 8 performs coordinate calculation.

Expression 36 shows a correction expression. Here, $\Delta X(y_h)$, $\Delta Y(y_h)$ are obtained by calculating, from a rotation amount of the digital camera 100, a correction amount for a row (horizontal line) of an image height h in reference to a reference row Y0w including the image center. $X_h$, $Y_h$ are coordinates without a rolling shutter distortion, whereas $X'_w$, $Y'_w$ are coordinates including a rolling shutter distortion.

$$\begin{bmatrix} X'_w \\ Y'_w \end{bmatrix} = \begin{bmatrix} X_h \\ Y_h \end{bmatrix} - \begin{bmatrix} \Delta X(Y_h) \\ \Delta Y(Y_h) \end{bmatrix} \quad \text{(Expression 36)}$$

Similarly, Expression 37 shows a correction expression for a rolling shutter distortion in the roll direction. An example of rolling shutter distortion removal correction in the roll direction is shown on the right side of FIG. 5C. With regard to the rolling shutter distortion removal processing in the roll direction, the influences of a rolling shutter distortion are removed through rotation correction in which a rotation amount changes on a row-by-row basis in reference to coordinates of the image center that take the optical anti-shake operation into consideration in accordance with Expression 37.

$$\vec{x}_{rsc}(,l) = \begin{bmatrix} \cos(-\Theta(l)) & -\sin(-\Theta(l)) \\ \sin(-\Theta(l)) & \cos(-\Theta(l)) \end{bmatrix} \vec{x}'(,l) \quad \text{(Expression 37)}$$

The mechanism of the occurrence of a rolling shutter distortion is substantially the same as that of a shake. Therefore, if a shake of the digital camera 100 includes only rotational direction components and the rolling shutter distortion correction is performed only through projective transformation (homography) based on the orientational change information, it is necessary to execute correction processing in order of roll and pan or tilt. This order is reversed when the backward mapping is performed.

The reference line Y0w does not move in the rolling shutter distortion correction. If the rolling shutter distortion correction is performed by itself, it is not necessary to pay particular attention to the position of the reference line Y0w. However, if collective processing is executed in combination with other corrective transformations, a change in the reference line Y0w causes the image center to move due to translation of an image position after the correction and a change in the scale attributed to magnification/reduction. Therefore, if a plurality of types of corrections are performed by combining a plurality of geometric deformations as in the present embodiment, it is necessary to appropriately manage a reference line.

Skew correction is processing for correcting a radial distortion and a distortion caused by aberration of the optical system, such as transverse chromatic aberration, through geometric deformation, and mainly corrects a radial distortion. The deformation processing unit 8 obtains skew correction information as a geometric deformation parameter from the skew correction information retaining unit in the change amount calculation unit 6, which retains the skew correction information in a form that enables search for camera parameters (a focal length, an in-focus distance, and an aperture value) as indexes. The skew correction information may be, for example, a table showing a skew rate output from design data, or a ratio between an ideal image height and a skewed image height, which is a modified form of the skew rate.

The following describes the details of skew correction based on an exemplary case in which a table showing a ratio between image heights is used as the skew correction information. In coordinate calculation for realizing skew correction, which can be expressed by Expression 38, coordinates before geometric transformation are transformed into polar coordinates in reference to the center of geometric deformation (reference coordinates for coordinate transformation) X0d, Y0d. High-accuracy correction can be realized by using the image center as the reference coordinates (X0d, Y0d).

$$r_n = \sqrt{(X_w - X_{0d})^2 + (Y_w - Y_{0d})^2} \quad \text{(Expression 38)}$$
$$r_d = f(r_n) r_n$$
$$\begin{bmatrix} X'_d \\ Y'_d \end{bmatrix} = \frac{r_d}{r_n} \begin{bmatrix} X_w - X_{0d} \\ Y_w - Y_{0d} \end{bmatrix} + \begin{bmatrix} X_{0d} \\ Y_{0d} \end{bmatrix}$$

Here, $f(r_n)$ denotes an operation for obtaining a value of a ratio between an ideal image height and a skewed image height through interpolation based on the table showing the image height ratio using the ideal image height as an argument. The third expression denotes an operation of coordinate transformation from polar coordinates to Cartesian coordinates. Examples of skew correction have already been described above with reference to FIGS. 6A to 6C.

The deformation processing unit 8 performs the above-described skew correction, rolling shutter distortion correction, and shake correction based on a correction amount calculated by the correction amount calculation unit 7; this makes it possible to obtain a frame image for which the anti-shake operation and distortion correction have been performed.

According to the present embodiment described above, an image change that occurs due to the influence of at least one of a rotational motion around an axis perpendicular to the optical axis of the imaging optical system, and a difference between exposure periods of the image sensor, is cancelled using a motion vector. Therefore, at least one of shake components in a direction perpendicular to the optical axis of the imaging optical system, shake components of a rotational motion around the optical axis, and shake components of magnification/reduction can be calculated.

Furthermore, by combining information of shake components calculated from a motion vector with output of a sensor that detects an amount of rotational motion around the pitch and yaw axes, it is possible to efficiently and accurately calculate an image change caused by a rotational motion of the camera around three axes and by a six-degree-of-freedom movement of the camera related to a translational motion in three axial directions.

Second Embodiment

Figure 10:
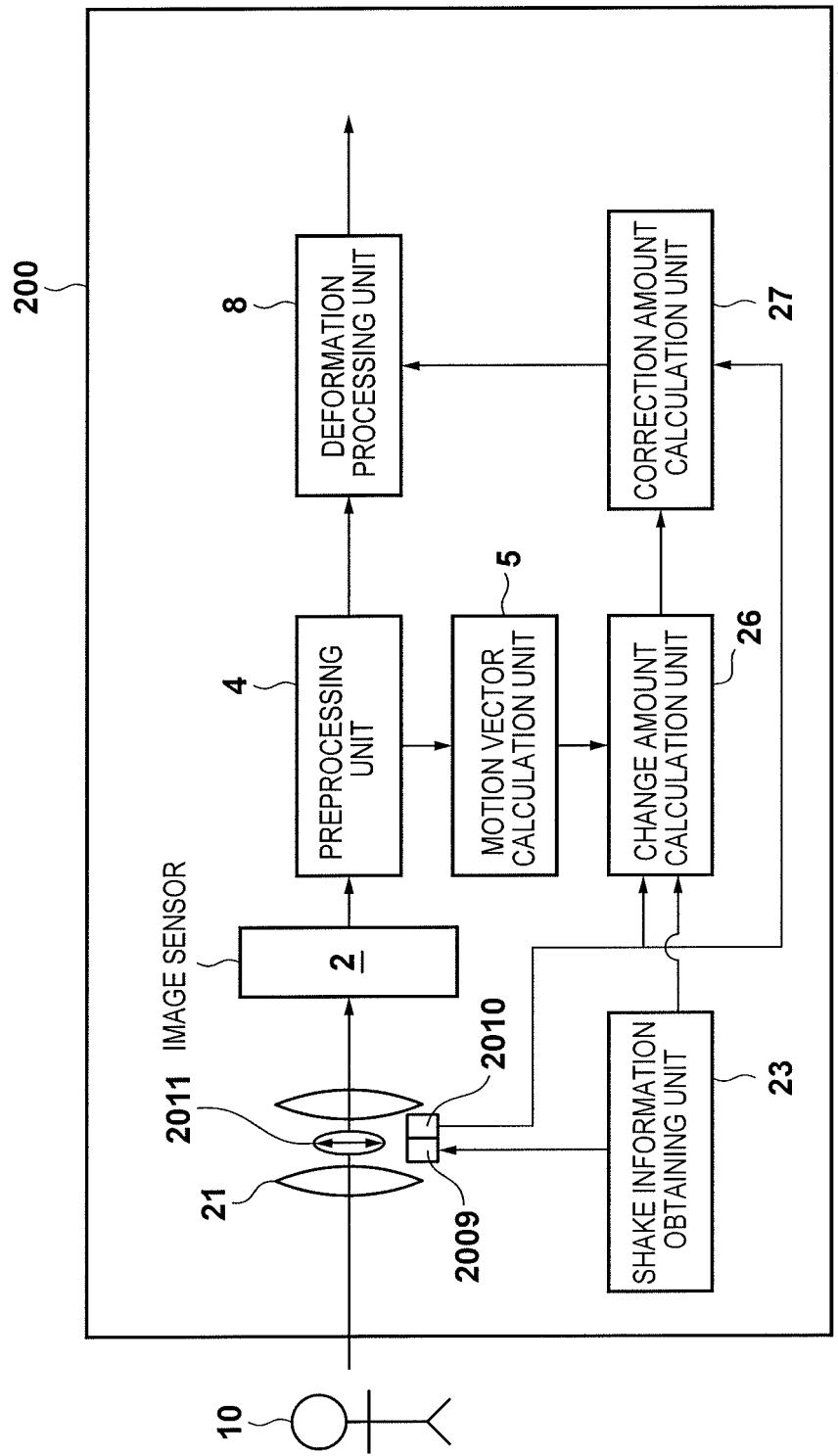
FIG. 10 shows an example of a functional configuration of a digital camera, which is one example of an image capture apparatus according to a second embodiment, related to anti-shake control.

The following describes a second embodiment of the present invention with reference to FIG. 10. FIG. 10 is a block diagram schematically showing an example of a functional configuration of a digital camera 200, which is one example of an image capture apparatus according to the second embodiment of the present invention. Constituents of the digital camera 200 that are similar to those of the first embodiment are given reference numerals similar to those of the first embodiment, and a description thereof is omitted.

An optical system 21 is an imaging optical system that includes a plurality of lenses, such as a focus lens and a shake correction lens 2011, and focuses incident light from a subject 10 onto an imaging plane of an image sensor 2. The image sensor 2, which is a CCD image sensor or a CMOS image sensor, is composed of a plurality of pixels that are two-dimensionally arrayed. The digital camera 200 has an optical anti-shake function for reducing a shake of an image caused by a shake of the digital camera 200 by causing the shake correction lens 2011 to move along a plane perpendicular to an optical axis so as to translate the position of an optical image on the imaging plane. Alternatively, an optical anti-shake function may be provided for causing the image sensor 2, in place of the shake correction lens 2011, to move along the plane perpendicular to the optical axis. The shake correction lens 2011 and the image sensor 2 can be driven using an actuator provided with piezoelectric elements and the like, an electromagnet, etc. Herein, a shake correction lens and an image sensor that are configured to be movable along the plane perpendicular to the optical axis are referred to as optical correction elements.

An optical anti-shake control unit 2009 performs an optical anti-shake operation by controlling translation of an optical correction element. The optical anti-shake control unit 2009 controls translation of the shake correction lens 2011 if the shake correction lens 2011 is the optical correction element, and controls translation of the image sensor 2 if the image sensor 2 is the optical correction element.

A monitoring unit 2010 includes, for example, a Hall sensor or an encoder and measures a translation amount of the shake correction lens 2011. The monitoring unit 2010 may also obtain control information of the optical anti-shake control unit 2009 in place of a shake information obtaining unit 23.

The shake information obtaining unit 23 includes, for example, an orientation sensor such as a gyroscope, and is attached to any axis perpendicular to an optical axis of the optical system 21. The shake information obtaining unit 23 outputs a signal indicating an orientational change of the digital camera 200 to the optical anti-shake control unit 2009 and a change amount calculation unit 26. For example, if the orientation sensor is a rotation sensor, the shake information obtaining unit 23 is attached to axes of the yaw, pitch, and roll directions of the digital camera 200 and measures an orientational change caused by rotation around the axes. However, the orientation sensor need not necessarily be provided for the three axes, and may detect rotation around the yaw and pitch axes similarly to the first embodiment. The optical anti-shake control unit 2009 reduces a shake of a captured image caused by a shake of the digital camera 200 by causing the shake correction lens 2011 (or the image sensor 2) to move along the plane perpendicular to the optical axis based on the measured orientational change of the digital camera 200.

The role of a correction amount calculation unit 27 is substantially similar to the role of the correction amount calculation unit 7 according to the first embodiment. The correction amount calculation unit 27 additionally has a role of obtaining, on a frame-by-frame basis, a position of an image center serving as a reference for geometric transformation in a deformation processing unit 8 based on later-described control information for an optical anti-shake operation obtained from the monitoring unit 2010.

The following describes processing of main constituents of the digital camera 200 according to the present embodiment in order.

The monitoring unit 2010 measures an actual amount of movement of the shake correction lens 2011 according to control by the optical anti-shake control unit 2009, and outputs the measured amount to the change amount calculation unit 26 and the correction amount calculation unit 27. Specifically, the monitoring unit 2010 calculates a position of an image center that has been moved due to translation of the shake correction lens 2011, and information for monitoring a change velocity of the position of the image center. An image center denotes an intersection between the optical axis of the optical system 21 and the image sensor 2. Therefore, a translation amount of an optical image caused by a movement of the optical correction element is equivalent to a translation amount of an image center. The monitoring unit 2010 outputs a value of a translation amount of the shake correction lens 2011 measured using the Hall sensor, encoder, and the like. Similarly to Expression 1 used by the orientation sensor of the shake information obtaining unit 23, the output may be performed after improving the accuracy of the measured value by, for example, using a calibration coefficient such as a correction gain and applying processing for improving the accuracy of the measured value. On the other hand, if the measured value does not require high accuracy, a value obtained by transforming driving/control information of the shake correction lens 2011 output by the optical anti-shake control unit 2009 into an amount of movement may be output without performing the measurement.

Figure 12A:
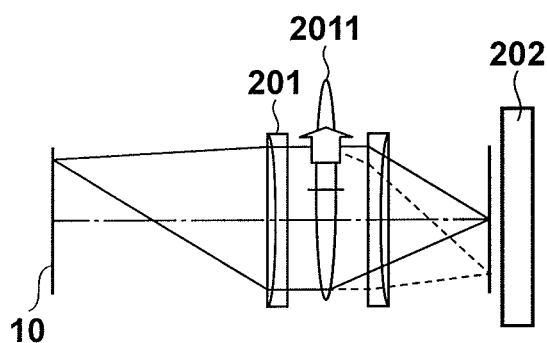
FIGS. 12A to 12D are diagrams for describing an optical anti-shake operation using a shake correction lens.
Figure 12B:
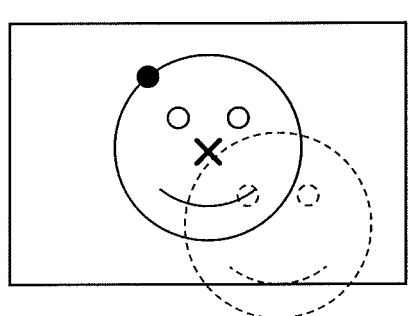

First, an optical anti-shake operation for translating the shake correction lens 2011 will be described with reference to FIGS. 12A to 12D. The optical system 21 is configured to form an optical image of a subject 10 onto the imaging plane of the image sensor 2. Referring to FIG. 12A, broken lines indicate optical paths corresponding to a position of the shake correction lens 2011, which is the optical correction element, prior to the movement, whereas solid lines indicate optical paths obtained by translating the shake correction lens 2011 upward. By moving the shake correction lens 2011 upward, an image of the subject moves toward the center of the image sensor 2. That is to say, as indicated by dash lines and solid lines in FIG. 12B, the movement of the shake correction lens 2011 enables a position at which an image of a subject is formed in the image sensor 2 to translate from a lower peripheral portion toward the center. In FIG. 12B, x and ● respectively denote image centers before and after the movement of the shake correction lens 2011. In this way, the image center moves along with the translation of the optical image.

Figure 12C:
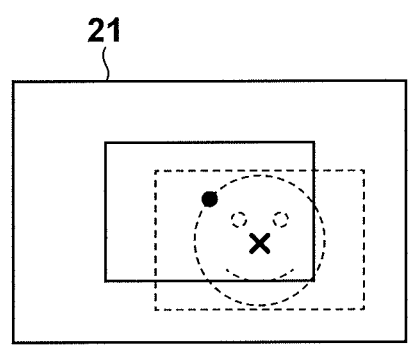
Figure 12D:
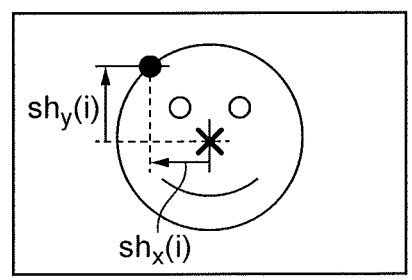

If the image sensor 2 is the optical correction element, the image sensor 2 is moved along the plane perpendicular to the optical axis in place of the shake correction lens 2011. In this case, an image capture region is smaller than an effective pixel region of the image sensor 2. FIG. 12C schematically shows a positional change in an optical image and an image center (the center of an image capture region 21) for a case where the image sensor 2 is the optical correction element. Similarly to FIG. 12B, x and ● respectively denote image centers before and after the movement of the image sensor 2. Although a direction of movement of the image sensor 2 and a direction of movement of the shake correction lens 2011 are symmetric with the optical axis therebetween, similar effects are achieved; therefore, in the following description of geometric image transformation, which one of the shake correction lens 2011 and the image sensor 2 is the optical correction element is not distinctively mentioned. If the image sensor 2 is the optical correction element, the optical anti-shake control unit 2009 translates the image sensor 2, and the monitoring unit 2010 measures a translation amount of the image sensor 2.

In the present embodiment, translation information $sh_x$ (x=Y, P) of a captured image is used as one example of monitoring information for optical anti-shake control, because it represents a physical amount that is easily treated in geometric transformation processing. As described above, as a translation amount of an image is equivalent to (or can be transformed from) a translation amount of the optical correction element, a translation amount of the optical correction element is used in practice. It should be noted that, as indicated by the following Expression 39, translation information of a captured image may be normalized using a focal length, which is a camera parameter, and used as a translation amount in a normalized space for a focal length 1.

$$sh_x = sh_x'/f \qquad \text{(Expression 39)}$$

In Expression 39, $sh_x'$ (x=Y, P) denotes a translation amount of an image in units of [mm] or [pixel], and f denotes a focal length of the optical system 21 in units of [mm] or [pixel]. Also, $sh_x$ (x=Y, P) denotes a normalized translation amount.

In addition to a translation amount of a time point i, $sh_x(i)$, the following change velocity of the translation amount $sh_x(i)$ is also one of the important monitoring information for the optical anti-shake control as it affects a rolling shutter distortion.

$$\Delta sh_x(i) = sh_x(i) - sh_x(i-1) \qquad \text{(Expression 40)}$$

It is preferable that the sampling rates of $sh_x(i)$, $\Delta sh_x(i)$ are higher than or equal to the above-described $f_{s\_fr}$, $f_{s\_rsc}$.

The monitoring unit 2010 outputs, to the change amount calculation unit 26, a translation amount of the shake correction lens 2011 and a change velocity thereof as a translation amount of an image, $sh_x(i)$, and a change velocity $\Delta sh_x(i)$ thereof serving as monitoring information for the optical anti-shake control. The monitoring unit 2010 also outputs, to the correction amount calculation unit 27, a translation amount of the shake correction lens 2011 as a translation amount of an image, $sh_x(i)$, serving as monitoring information for the optical anti-shake control.

The change amount calculation unit 26 calculates amounts of image change between frame images based on the following.

Camera parameters including a focal length (an angle of view) of the optical system 21, a pixel size of the image sensor 2, and the like Information of an orientational change of the digital camera 200 obtained from the shake information obtaining unit 23

Motion vector information obtained from a motion vector calculation unit 5

Information of a translation amount of an image caused by the optical anti-shake operation and a change velocity thereof, the information being obtained from the monitoring unit 210

Similarly to the first embodiment (FIG. 3), processing for calculating an amount of image change is executed through the following two steps: a corresponding point (motion vector) correction step; and an orientational change estimation step. Therefore, in the following expression, reference numerals that are the same as those in FIG. 3 are used for the sake of convenience, regardless of whether or not the processing is the same.

In the corresponding point (motion vector) correction step (step S100), the change amount calculation unit 26 performs correction by transforming a motion vector obtained from the motion vector calculation unit 5 into corresponding points in an image. First, based on orientational change information obtained by the shake information obtaining unit 23, the change amount calculation unit 26 first performs transformation into a coordinate change in an undistorted image obtained by removing a rolling shutter distortion and a skew from each frame image. The change amount calculation unit 26 also executes processing for removing the influences of a movement of an image center caused by the optical anti-shake operation and the influences of rotation of the digital camera 200 around all of the yaw, pitch and roll axes, and leaving only an image change caused by a translational motion as a coordinate change. An image change caused by a translational motion of the digital camera 200 includes a movement related to translation in the horizontal and vertical directions, magnification/reduction, and parallax.

Similarly to the first embodiment (FIG. 4), the corresponding point (motion vector) correction step (step S100) includes the following four steps: obtainment of corresponding points; removal of a rolling shutter distortion; removal of a skew; and removal of a rotational movement. In the following description, reference numerals that are the same as those in FIG. 4 are used for the sake of convenience, even if the substance of processing is not the same.

The step of obtaining corresponding points is similar to step S101 according to the first embodiment, and therefore a description thereof is omitted. Here, the change amount calculation unit 26 transforms a motion vector $\Delta \vec{x} = (\Delta x, \Delta y)$ into an interest point $\vec{x} = (x,y)$ and a corresponding point $\vec{x}' = (x',y')$ in accordance with Expression 6 described above.

Next, the change amount calculation unit 26 removes the influences of the optical anti-shake operation in normalization processing.

$$C = \begin{bmatrix} f & 0 & c_x + sh_Y(i) \\ 0 & f & c_y + sh_P(i) \\ 0 & 0 & 1 \end{bmatrix}, \bar{x}_n = C\bar{x}, \bar{x}_n' = C\bar{x}' \qquad \text{(Expression 41)}$$

Here, $sh_Y(i)$, $sh_P(i)$ denote translation amounts of an image center that has been moved through the optical anti-shake operation, which are used to remove the influences of the optical anti-shake operation.

Next, the change amount calculation unit 26 removes a rolling shutter distortion (step S102). The change amount calculation unit 26 removes a rolling shutter distortion caused by a shake of the digital camera 200 from coordinates of corresponding points based on the following.

Inter-frame orientational change information of the image capture apparatus from the shake information obtaining unit 23

Translation amounts $sh_Y(i)$, $sh_P(i)$ of the image center and change velocities $\Delta sh_Y(i)$, $\Delta sh_P(i)$ of translation from the monitoring unit 210

In a case where the orientation sensor is provided for all of the three axes of the digital camera 200, that is to say, the yaw, pitch and roll axes, the change amount calculation unit 26 removes a rolling shutter distortion with respect to all of the axial directions. Furthermore, with regard to the yaw and pitch axes, in addition to consideration for an amount of orientational change described in the first embodiment, a change velocity $\Delta sh_x(1)$ (x: Y, P) of translation in the optical anti-shake operation is subtracted for each row in each frame in the expressions for the yaw and pitch directions in order to subtract the influences of the optical anti-shake operation. The idea of the first embodiment applies to the roll direction. Calculation is performed using the moved image center as a reference for correction processing. The amounts of rolling shutter distortion correction ($\Delta X$, $\Delta Y$, $\Delta \Theta$) are obtained using the following Expression 42.

$$\Delta Y(l) = \int_{t_l}^{\tau_l} f\tan\theta_Y(s) - \Delta sh_Y(s)\,ds \quad \text{(Expression 42)}$$

$$\Delta P(l) = \int_{t_l}^{\tau_l} f\tan\theta_P(s) - \Delta sh_P(s)\,ds$$

$$\vec{x}_{rsc}(,l) = \begin{bmatrix} \cos(-\Theta(l)) & -\sin(-\Theta(l)) \\ \sin(-\Theta(l)) & \cos(-\Theta(l)) \end{bmatrix} \vec{x}'(,l)$$

$$\text{where } \Delta\Theta(l) = \int_{t_l}^{\tau_l} \theta_R(s)\,ds$$

An example of rolling shutter distortion correction in the roll direction is shown in FIG. 5C. The change amount calculation unit 26 removes the influences of a rolling shutter distortion in the roll direction through rotation correction in which a rotation amount changes on a row-by-row basis in reference to coordinates of the image center that take the optical anti-shake operation into consideration in accordance with the third and fourth expressions of Expression 42.

In the skew removal step (step S103), the influences of a skew are removed from coordinate information $x_{rsc}\rightarrow$ from which the rolling shutter distortion has been removed. While coordinate calculation in the skew correction is basically the same as a method according to the first embodiment, it is indicated by the following Expression 43 as it is performed using an image center that moves through the optical anti-shake operation as a reference for correction processing.

$$r_d = \sqrt{(X'_d - X_{0d} - sh_Y(i))^2 + (Y'_d - Y_{0d} - sh_P(i))^2} \quad \text{(Expression 43)}$$

$$r_n = r_d / f(r_d)$$

$$\begin{bmatrix} X_{dc} \\ Y_{dc} \end{bmatrix} = \frac{r_n}{r_d}\begin{bmatrix} X'_d - X_{0d} - sh_Y(i) \\ Y'_d - Y_{0d} - sh_P(i) \end{bmatrix} + \begin{bmatrix} X_{0d} + sh_Y(i) \\ Y_{0d} + sh_P(i) \end{bmatrix}$$

The rotational movement removal step (step S104) is a step of cancelling changes in coordinates of corresponding points caused by a rotational motion of the digital camera 200, the changes remaining in an undistorted coordinate space for which a rolling shutter distortion and a skew have been removed. Similarly to the first embodiment, the change amount calculation unit 26 cancels changes in coordinates caused by a rotational motion based on a pinhole camera model using an orientational change between frames obtained by a rotation orientation sensor. At this time, correction is performed in consideration of a movement of an image center caused by the optical anti-shake operation.

For example, assuming that a rotational motion of the digital camera 200 is detected around the three axes, that is to say, the yaw, pitch and roll axes, a homography of a geometric deformation parameter is given using the XYZ Euler angle expression as indicated by Expression 44.

$$H(j) = \begin{bmatrix} a & b & c \\ d & e & f \\ g & h & i \end{bmatrix} = \begin{bmatrix} \cos(R) & -\sin(R) & 0 \\ \sin(R) & \cos(R) & 0 \\ 0 & 0 & 1 \end{bmatrix} \quad \text{(Expression 44)}$$

$$\begin{bmatrix} \cos(Y) & 0 & \sin(Y) \\ 0 & 1 & 0 \\ -\sin(Y) & 0 & \cos(Y) \end{bmatrix}\begin{bmatrix} 1 & 0 & 0 \\ 0 & \cos(P) & -\sin(P) \\ 0 & \sin(P) & \cos(P) \end{bmatrix}$$

$$Y = rat_{Y\_fr}(j),\ P = rat_{P\_fr},\ R = rat_{R\_fr}(j)$$

Here, $rat_{x\_fr}(i)$ (x=Y, P, R) denotes a rotation amount of the digital camera 200 around the yaw, pitch and roll axes integrated in a period j between certain frames. Then, the change amount calculation unit 26 subtracts the effects of the optical anti-shake operation that has already been optically corrected from a shake correction amount calculated from the state of the orientational change as indicated by the following Expression 45.

$$H'(i) = \begin{bmatrix} a & b & c - sh_Y(j) \\ d & e & f - sh_P(j) \\ g & h & 1 \end{bmatrix} \quad \text{(Expression 45)}$$

Before subtracting the optical anti-shake effects, the change amount calculation unit 26 performs normalization by dividing the entire matrix by elements of three rows and three columns in H(i) for the purpose of matrix scaling. Here, $sh_x(i)$ (x: Y, P) is a normalized translation amount of an image through the optical anti-shake operation at a time point i, which is obtained from the monitoring unit 210.

As stated earlier, the influences of a rotational motion can be removed by applying this homography to corresponding points in a normalized image coordinate space. For example, the influences of a rotational motion can be removed by applying this homography to coordinates in an old frame. While the idea of the first embodiment basically applies to the calculation, the calculation is performed using a moved image center as a reference for correction processing as indicated by Expression 46.

$$\begin{bmatrix} X'_h \\ Y'_h \\ m \end{bmatrix} = H\begin{bmatrix} X_r - X_{0h} - sh_Y(i) \\ Y_r - Y_{0h} - sh_P(i) \\ 1 \end{bmatrix} + \begin{bmatrix} X_{0h} + sh_Y(i) \\ Y_{0h} + sh_P(i) \\ 0 \end{bmatrix}, \quad \text{(Expression 46)}$$

$$\begin{bmatrix} X''_h \\ Y''_h \end{bmatrix} = \begin{bmatrix} X'_h/m \\ Y'_h/m \end{bmatrix}$$

Here, $X_{0h}+sh_Y(i), Y_{0h}+sh_P(i)$ are terms specifying the center of transformation (reference coordinates of geometric transformation). These terms are not necessary in a case where transformation processing is executed in the normalization in step S101 of obtaining corresponding points in consideration of a movement of an image center caused by the optical anti-shake operation.

Next, in step S200, the change amount calculation unit 6 executes orientational change estimation processing for estimating an orientational change of the digital camera 100 between a current frame and an old frame based on input corrected corresponding points between these frames. The change amount calculation unit 6 executes the orientational change estimation processing based on information of corresponding points for which the influences of a distortion and the influences of a rotational motion of the digital camera 100 have been removed after transformation into values in the normalized image coordinate system in the corresponding point (motion vector) correction step of step S100.

In the orientational change estimation step (S200), the change amount calculation unit 26 executes orientational change estimation processing for estimating an orientational change of the digital camera 100 between a current frame and an old frame based on input corrected corresponding points between these frames. The change amount calculation unit 6 executes the orientational change estimation processing based on information of corresponding points for which the influences of a distortion and the influences of a rotational motion of the digital camera 100 have been removed after transformation into values in the normalized image coordinate system in the corresponding point (motion vector) correction step of step S100.

Similarly to the first embodiment, it is assumed that $\vec{n}$ specifying the orientation of a reference plane Π is defined in parallel to an imaging plane from an old viewpoint C of the digital camera 200 (that is to say, $\vec{n}'[=0\ 0\ 1]^T$), and the influences of a rotational motion on corresponding points have already been removed in a previous step (R=Rz(φ)). Based on this premise, an orientation estimation expression is rewritten. The present embodiment is additionally based on the premise that, as the characteristics of the anti-shake operation, magnification/reduction of an image change is often not considered; therefore, the following Expression 47 applies.

$$\varepsilon = \sum_i \left| \bar{x}_i' - \left( \begin{bmatrix} 1 & 0 & t_x/d \\ 0 & 1 & t_y/d \\ 0 & 0 & 1-t/d_z \end{bmatrix} \right) \bar{x}_i \right| = \qquad \text{(Expression 47)}$$

$$\sum_i \left| \bar{x}_i' - \left( \begin{bmatrix} 1 & 0 & t_x' \\ 0 & 1 & t_y' \\ 0 & 0 & 1 \end{bmatrix} \right) \bar{x}_i \right| \{t_x', t_x'\}_{best} = \underset{\{s=1,t_x',t_x'\}}{\operatorname{argmin}}(\varepsilon)$$

It should be noted that the following and homogeneous properties are used in expression transformation:

$s=1/(1-t/d_z), t'_x=t_x/d(1-t_z/d), t'_y=t_y/d(1-t_z/d).$

Figure 11:
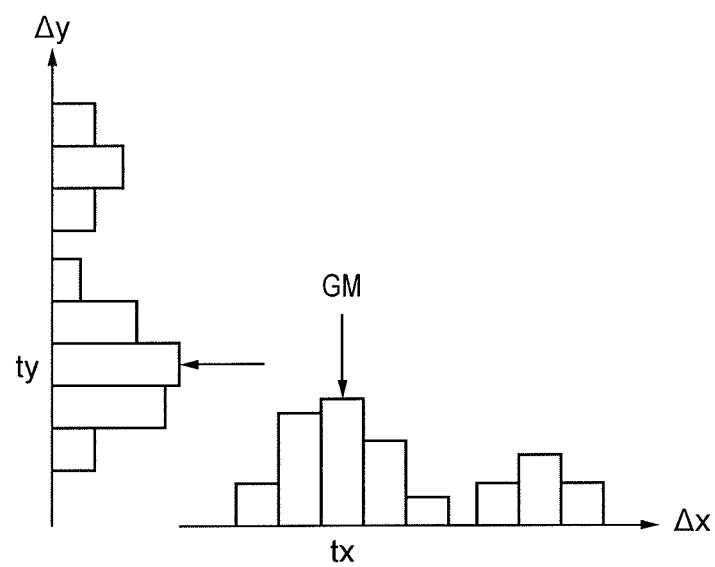
FIG. 11 schematically shows a method for obtaining horizontal translation $t_x$ and vertical translation $t_y$ through two-dimensional histogram processing in the second embodiment.

As a result of this transformation, the orientation estimation expression turns into an estimation expression for a general translation parameter. Remaining parameters for an image change can be estimated by obtaining an image change caused by translation using, for example, a method of least squares. Alternatively, a global motion (GM) may be obtained through two-dimensional histogram processing shown in FIG. 11, and the obtained global motion (GM) may be used as horizontal translation $t_x$ and vertical translation $t_y$.

The product H' of the homography expressing rotation used in the correction processing and the homography of the translation parameter for the digital camera 200 thus calculated denotes an image change between frame images with degrees of projective freedom. In other words, this is equivalent to a parameter for a movement caused by an orientational change of the digital camera 200 with five-axis degrees of freedom. In this way, a homography expressing an image change between frames other than magnification/reduction and parallax can be obtained (Expression 48).

$$H' = \begin{bmatrix} 1 & 0 & t_x \\ 0 & 1 & t_y \\ 0 & 0 & 1 \end{bmatrix} \begin{bmatrix} \cos(\alpha R) & -\sin(\alpha R) & 0 \\ \sin(\alpha R) & \cos(\alpha R) & 0 \\ 0 & 0 & 1 \end{bmatrix} \qquad \text{(Expression 48)}$$

$$\begin{bmatrix} \cos(\alpha Y) & 0 & \sin(\alpha Y) \\ 0 & 1 & 0 \\ -\sin(\alpha Y) & 0 & \cos(\alpha Y) \end{bmatrix} \begin{bmatrix} 1 & 0 & 0 \\ 0 & \cos(\alpha P) & -\sin(\alpha P) \\ 0 & \sin(\alpha P) & \cos(\alpha P) \end{bmatrix}$$

Similarly to the first embodiment, the correction amount calculation unit 7 processes amounts of image change between image frames output by the change amount calculation unit 26 in chronological order, and calculates amounts of geometric deformation for an anti-shake operation in consideration of a degree of shake reduction and a margin amount of geometric deformation, that is to say, correction amounts. This processing is similar to that of the first embodiment, except that information from the shake information obtaining unit 23 includes information about the roll axes, that is to say, information about a total of three axes, motion information obtained from an image vector indicates only translation, and an image center moves due to the optical anti-shake operation. Regarding a rolling shutter distortion, a correction amount is calculated based on sensor information with respect to rotations around all axes.

In this way, the correction amount calculation unit 7 according to the present embodiment obtains correction amounts of respective components (a skew correction parameter f(r), shake correction parameters (Y(j), P(j), R(j), s(j), θ(j), $t_x$(j), $t_y$(j)), and rolling shutter distortion correction parameters (ΔX, ΔY, ΔΘ).

Then, based on these correction amounts obtained by the correction amount calculation unit 7 and on amounts $X_{sh}$, $Y_{sh}$ of movement of an image center caused by the optical anti-shake correction, the deformation processing unit 8 applies geometric transformation to an output image from the preprocessing unit 4.

Figure 15:
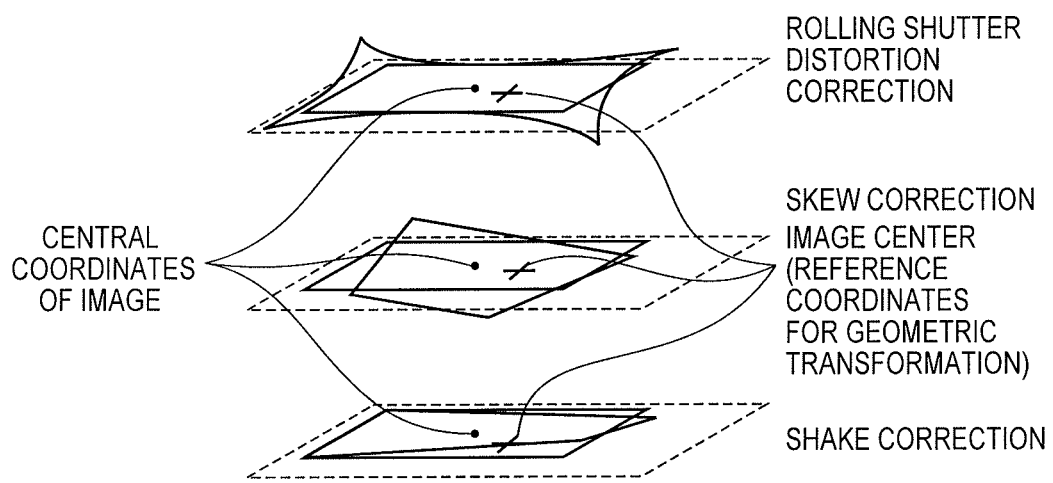
FIG. 15 schematically shows control in which an image center is used as reference coordinates for geometric deformation related to rolling shutter distortion correction, skew correction, and shake correction in the second embodiment.

In the geometric transformation, an image change caused by a movement of the digital camera 200 is corrected (the anti-shake operation) by performing rolling shutter correction, skew correction, and shake correction. Similarly to the first embodiment, the actual geometric transformation is performed using backward matching to prevent defective pixels. Furthermore, as shown in FIG. 15, an image center that moves in accordance with the optical anti-shake operation is taken into consideration as reference coordinates for the geometric transformation; consequently, the influences of the optical anti-shake operation are taken into consideration. Correction calculation is performed using reference coordinates for the rolling shutter correction, skew correction, and shake correction as an image center moved through the optical anti-shake operation; in this way, conformity is achieved among the respective corrections.

According to the second embodiment, transformation is performed to remove the influences of an optical anti-shake operation and the influences of an image movement caused by rotations around at least an axis perpendicular to the optical axis of the imaging optical system and around the optical axis, or by the influences of a difference between exposure periods of the image sensor, using a motion vector calculated from an image for which the optical anti-shake operation has already been performed. In this way, shake components at least in the direction perpendicular to the optical axis can be calculated.

Also, by combining information of shake components calculated from a motion vector with rotation sensor information, an image change between frames caused by three-axis rotation and two-axis translation of the image capture apparatus, that is to say, a total of five-axis movement of the image capture apparatus, can be calculated.

The present embodiment also realizes a plurality of different corrections, such as skew correction, correction of an image movement caused by the influences of a difference between exposure periods of the image sensor, and shake correction, by further applying geometric deformation processing to an image to which the optical anti-shake correction has already been applied. In such an advanced anti-shake operation, transformation is performed to remove an image movement caused by the influences of rotation around at least an axis perpendicular to the optical axis of the imaging optical system or a difference between exposure periods of the image sensor using a motion vector. In this way, at least one of shake components at least in the direction perpendicular to the optical axis, shake components in the direction of rotation around the optical axis, and shake components related to magnification/reduction can be calculated. This makes it possible to suppress excessive correction amounts even if the correction amounts are calculated using both information obtained from a motion vector and information obtained from the rotation sensor.

Moreover, according to the present embodiment, components of an image change caused by rotation around the optical axis of the imaging optical system and around an axis perpendicular to the optical axis, and by translation in the direction of the optical axis of the imaging optical system and in the direction of an axis perpendicular to the optical axis, can always be calculated by removing the influences of an optical anti-shake operation also with respect to an image to which the optical anti-shake operation has already been applied. That is to say, orientation information composed of rotation and translation of the image capture apparatus can be correctly obtained without being subjected to the influences of the optical anti-shake operation. This is useful in, for example, AR (Augmented Reality) in which orientation information of the image capture apparatus is used in positioning of an image.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-200520, filed on Sep. 26, 2013, which is hereby incorporated by reference herein its entirety.

What is claimed is:

1. An image capture apparatus comprising:
a detection unit configured to detect a motion vector between images obtained by an image sensor;
an obtaining unit configured to obtain shake information related to a shake in a rotational direction around an axis perpendicular to an optical axis of an imaging optical system;
a calculation unit configured to calculate an amount of change between the images based on the shake information and on the motion vector;
a determination unit configured to determine a shake correction amount based on the shake information and on the amount of change; and
a deformation unit configured to geometrically deform an image obtained by the image sensor based on the shake correction amount, wherein
the calculation unit calculates a shake component of the image capture apparatus in a direction perpendicular to the optical axis as the amount of change, after cancelling a change between images caused by an influence of a difference between exposure periods of the image sensor included in the motion vector, based on the shake information.

2. The image capture apparatus according to claim 1, wherein
if the shake information does not include information related to a shake in a rotational direction around the optical axis, the calculation unit further calculates, after cancelling the deformation, a shake component of the image capture apparatus in the rotational direction around the optical axis as the amount of change.

3. The image capture apparatus according to claim 1, wherein
the calculation unit calculates the amount of change, after further cancelling a change between images caused by optical aberration of the imaging optical system included in the motion vector.

4. The image capture apparatus according to claim 3, wherein
the calculation unit cancels the change between the images caused by the optical aberration using a geometric deformation parameter corresponding to a parameter for the imaging optical system.

5. The image capture apparatus according to claim 1, further comprising
an optical anti-shake function configured to reduce a shake of an image by driving an optical correction element in a direction different from the optical axis, wherein
the calculation unit calculates the shake component after removing an influence of the reduction of the shake by the optical anti-shake function on a change between images.

6. The image capture apparatus according to claim 1, wherein
the shake information is based on an output of a sensor that measures a rotation amount of the image capture apparatus around a yaw axis and a pitch axis.

7. The image capture apparatus according to claim 1, wherein
the shake component of the image capture apparatus in the direction perpendicular to the optical axis is a shake component caused by a translational motion of the image capture apparatus.

8. The image capture apparatus according to claim 1, wherein
the image sensor is a CMOS image sensor, and the change between the images caused by the influence of the difference between the exposure periods of the image sensor is a rolling shutter distortion.

9. A control method for an image capture apparatus, comprising:
a detection step of detecting a motion vector between images obtained by an image sensor;

an obtainment step of obtaining shake information related to a shake in a rotational direction around an axis perpendicular to an optical axis of an imaging optical system;

a calculation step of calculating an amount of change between the images based on the shake information and on the motion vector;

a determination step of determining a shake correction amount based on the shake information and on the amount of change; and a deformation step of geometrically deforming an image obtained by the image sensor based on the shake correction amount, wherein in the calculation step, a shake component of the image capture apparatus in a direction perpendicular to the optical axis is calculated as the amount of change, after cancelling a change between images caused by an influence of a difference between exposure periods of the image sensor included in the motion vector, based on the shake information.

10. A non-transitory computer-readable storage medium storing a program for causing a computer included in an image capture apparatus to execute a -control method for the image capture apparatus comprising:

a detection step of detecting a motion vector between images obtained by an image sensor;

an obtainment step of obtaining shake information related to a shake in a rotational direction around an axis perpendicular to an optical axis of an imaging optical system;

a calculation step of calculating an amount of change between the images based on the shake information and on the motion vector;

a determination step of determining a shake correction amount based on the shake information and on the amount of change; and a deformation step of geometrically deforming an image obtained by the image sensor based on the shake correction amount, wherein in the calculation step, a shake component of the image capture apparatus in a direction perpendicular to the optical axis is calculated as the amount of change, after cancelling a change between images caused by an influence of a difference between exposure periods of the image sensor included in the motion vector, based on the shake information.

11. An image capture apparatus comprising:

a detection unit configured to detect a motion vector between images obtained by an image sensor;

an obtaining unit configured to obtain shake information related to a shake in a rotational direction around an axis perpendicular to an optical axis of an imaging optical system;

a calculation unit configured to calculate an amount of change between the images based on the shake information and on the motion vector;

a determination unit configured to determine a shake correction amount based on the shake information and on the amount of change; and a deformation unit configured to geometrically deform an image obtained by the image sensor based on the shake correction amount, wherein the calculation unit calculates a shake component of the image capture apparatus in a direction perpendicular to the optical axis as the amount of change, after cancelling a change between images caused by optical aberration of the imaging optical system.

12. A control method for an image capture apparatus comprising:

detecting a motion vector between images obtained by an image sensor;

obtaining shake information related to a shake in a rotational direction around an axis perpendicular to an optical axis of an imaging optical system;

calculating an amount of change between the images based on the shake information and on the motion vector;

determining a shake correction amount based on the shake information and on the amount of change; and geometrically deforming an image obtained by the image sensor based on the shake correction amount, wherein in the calculating, a shake component of the image capture apparatus in a direction perpendicular to the optical axis is calculated as the amount of change, after cancelling a change between images caused by optical aberration of the imaging optical system.

13. A non-transitory computer-readable storage medium storing a program for causing a computer included in an image capture apparatus to execute a control method for an image capture apparatus comprising:

detecting a motion vector between images obtained by an image sensor;

obtaining shake information related to a shake in a rotational direction around an axis perpendicular to an optical axis of an imaging optical system;

calculating an amount of change between the images based on the shake information and on the motion vector;

determining a shake correction amount based on the shake information and on the amount of change; and geometrically deforming an image obtained by the image sensor based on the shake correction amount, wherein in the calculating, a shake component of the image capture apparatus in a direction perpendicular to the optical axis is calculated as the amount of change, after cancelling a change between images caused by optical aberration of the imaging optical system.

* * * * *